US012785909B2

(12) United States Patent
Zhang et al.

(10) Patent No.: US 12,785,909 B2
(45) Date of Patent: Nov. 3, 2026

(54) VARIABLE SUBBAND LOCATIONS FOR SUBBAND FULL DUPLEX CONFIGURATIONS

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 18/506,371

(22) Filed: Nov. 10, 2023

(65) Prior Publication Data

US 2025/0158791 A1 May 15, 2025

(51) Int. Cl.

| | |
|---|---|
| ***H04L 5/00*** | (2006.01) |
| ***H04B 7/06*** | (2006.01) |
| ***H04L 5/14*** | (2006.01) |

(52) U.S. Cl.

CPC ......... *H04L 5/0092* (2013.01); *H04B 7/0626* (2013.01); *H04L 5/14* (2013.01)

(58) Field of Classification Search

CPC ......... H04L 5/0094; H04L 5/14; H04L 5/001; H04L 5/0092; H04B 7/0626

See application file for complete search history.

(56) References Cited

U.S. PATENT DOCUMENTS

| | | | | |
|---|---|---|---|---|
| 2024/0283619 | A1* | 8/2024 | Nemeth | H04L 5/1461 |
| 2025/0220647 | A1* | 7/2025 | Wang | H04L 5/14 |
| 2025/0267667 | A1* | 8/2025 | Shim | H04L 5/00 |
| 2026/0142790 | A1* | 5/2026 | Moon | H04L 5/1423 |

FOREIGN PATENT DOCUMENTS

| | | | | |
|---|---|---|---|---|
| EP | 4580081 | A1 * | 7/2025 | H04B 7/0874 |
| EP | 4597914 | A1 * | 8/2025 | H04L 5/0051 |
| EP | 4637064 | A1 * | 10/2025 | H04L 5/0044 |
| EP | 4694448 | A1 * | 2/2026 | H04L 5/14 |

(Continued)

OTHER PUBLICATIONS

International Search Report and Written Opinion—PCT/US2024/051920—ISA/EPO—Jan. 31, 2025.

(Continued)

*Primary Examiner* — Shukri Taha

(74) *Attorney, Agent, or Firm* — Holland & Hart LLP

(57) ABSTRACT

Methods, systems, and devices for wireless communication are described. For example, a user equipment (UE) may indicate to a network node whether it is capable of supporting a subband full duplex (SBFD) configuration associated with multiple downlink (DL) subbands. For instance, the UE may indicate whether it supports more than one DL subband within one or more carriers associated with a SBFD operation. The UE may receive signaling from a network node indicating a SBFD configuration based on the capability signaling. The SBFD configuration may configure a first set of resources with a single DL subband and a single UL subband, a second set of resources with a single UL subband and multiple DL subbands, or both. The UE and the network node may communicate with each other according to the SBFD configuration.

30 Claims, 13 Drawing Sheets

200

(56) References Cited

FOREIGN PATENT DOCUMENTS

WO WO-2025226906 A1 * 10/2025 ........... H04L 5/0044

OTHER PUBLICATIONS

Youngsoo Y (Nokia)., et al., "On Subband Non-overlapping Full Duplex for NR", 3GPP TSG RAN WG1 #113, R1-2305397, Type Discussion, FS_NR_DUPLEX_EVO, 3rd Generation Partnership Project, Mobile Competence Centre, 650, Route Des Lucioles, F-06921 Sophia-Antipolis Cedex, France, vol. RAN WG1, No. Incheon, KR, May 22, 2023-May 26, 2023, May 15, 2023, 52 Pages, XP052310833, p. 8-p. 32.

Youngsoo Y (Nokia)., et al., "On Subband Non-overlapping Full Duplex for NR", 3GPP TSG RAN WG1 #114, R1-2306875, Type Discussion, FS_NR_DUPLEX_EVO, 3rd Generation Partnership Project, Mobile Competence Centre, 650, Route Des Lucioles, F-06921 Sophia-Antipolis Cedex, France, vol. RAN WG1, No. Toulouse, FR, Aug. 21, 2023-Aug. 25, 2023, Aug. 11, 2023, 45 Pages, XP052436106, p. 18-p. 19.

* cited by examiner

VARIABLE SUBBAND LOCATIONS FOR SUBBAND FULL DUPLEX CONFIGURATIONS

FIELD OF TECHNOLOGY

The present disclosure relates to wireless communication, including variable subband locations for subband full duplex configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support variable subband locations for subband full duplex (SBFD) configurations. For example, the described techniques provide for a user equipment (UE) to indicate (e.g., by transmitting control signaling) to a network node whether it is capable of supporting a SBFD configuration associated with multiple downlink (DL) subbands. For instance, the UE may indicate whether it supports more than one DL subband within one or more carriers associated with a SBFD operation. The UE may receive signaling from a network node indicating a SBFD configuration based on the capability signaling. The SBFD configuration may configure a first set of resources (e.g., with a single DL and uplink (UL) subband), a second set of resources (e.g., with a single UL subband and multiple DL subbands), or both. The UE and the network node may communicate with each other according to the SBFD configuration.

A method for wireless communication by a UE is described. The method may include transmitting capability signaling indicating whether the UE supports more than one downlink subband within one or more carriers associated with a subband full duplex operation, receiving signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and communicating one or more messages according to the subband full duplex configuration.

A UE for wireless communication is described. The UE may include one or more memories storing processor executable code, and one or more processors coupled with the one or more memories. The one or more processors may individually or collectively operable to execute the code to cause the UE to transmit capability signaling indicating whether the UE supports more than one downlink subband within one or more carriers associated with a subband full duplex operation, receive signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and communicate one or more messages according to the subband full duplex configuration.

Another UE for wireless communication is described. The UE may include means for transmitting capability signaling indicating whether the UE supports more than one downlink subband within one or more carriers associated with a subband full duplex operation, means for receiving signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and means for communicating one or more messages according to the subband full duplex configuration.

A non-transitory computer-readable medium storing code for wireless communication is described. The code may include instructions executable by one or more processors to transmit capability signaling indicating whether the UE supports more than one downlink subband within one or more carriers associated with a subband full duplex operation, receive signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and communicate one or more messages according to the subband full duplex configuration.

In some examples of the method, UEs, and non-transitory computer-readable medium described herein, the first downlink subband and the first uplink subband may be separated by a first guard band, the second downlink subband and the second uplink subband may be separated by a second guard band and the second uplink subband and the third downlink subband may be separated by a third guard band, or both, according to the subband full duplex configuration.

In some examples of the method, UEs, and non-transitory computer-readable medium described herein, the capability signaling indicates that the UE supports more than one downlink subband within the one or more carriers associated with the subband full duplex operation.

In some examples of the method, UEs, and non-transitory computer-readable medium described herein, the communicating may include operations, features, means, or instructions for transmitting a first message of the one or more messages using a first resource of the second set of resources and receiving a second message of the one or more messages using a second resource of the second set of resources.

In some examples of the method, UEs, and non-transitory computer-readable medium described herein, the capability signaling indicates that the UE excludes support for more than one downlink subband within the one or more carriers associated with the subband full duplex operation.

In some examples of the method, UEs, and non-transitory computer-readable medium described herein, the communicating may include operations, features, means, or instructions for communicating via the first set of resources.

In some examples of the method, UEs, and non-transitory computer-readable medium described herein, the communicating may include operations, features, means, or instructions for refrain from communicating via the second set of resources based on the UE excluding support for more than one downlink subband within the one or more carriers.

Some examples of the method, UEs, and non-transitory computer-readable medium described herein may further include operations, features, means, or instructions for receiving second signaling indicating a first channel state information reference signal (CSI-RS) resource associated with the second downlink subband and a second CSI-RS resource associated with the third downlink subband, where the first CSI-RS resource and the second CSI-RS resource may be linked.

Some examples of the method, UEs, and non-transitory computer-readable medium described herein may further include operations, features, means, or instructions for receiving second signaling indicating a CSI-RS resource that includes non-contiguous resources within the second downlink subband and the third downlink subband.

Some examples of the method, UEs, and non-transitory computer-readable medium described herein may further include operations, features, means, or instructions for receiving second signaling indicating a CSI-RS resource that includes contiguous resources that span across the second downlink subband and the third downlink subband and monitoring for a CSI-RS based on excluding the second uplink subband and one or more guard bands in-between the second downlink subband and the third downlink subband.

Some examples of the method, UEs, and non-transitory computer-readable medium described herein may further include operations, features, means, or instructions for transmitting respective reports indicating one or more cross link interference received signal strength indicator measurements in the second downlink subband and the third downlink subband, where each downlink subband includes one or more cross link interference received signal strength indicator resources.

Some examples of the method, UEs, and non-transitory computer-readable medium described herein may further include operations, features, means, or instructions for transmitting a report indicating one or more cross link interference received signal strength indication measurements in the first downlink subband, the second downlink subband, the third downlink subband, or any combination thereof.

Some examples of the method, UEs, and non-transitory computer-readable medium described herein may further include operations, features, means, or instructions for transmitting a report indicating one or more cross link interference received signal strength indication measurements based on a cross link interference received signal strength indicator resource that includes non-contiguous resources in the second downlink subband and the third downlink subband.

In some examples of the method, UEs, and non-transitory computer-readable medium described herein, receiving the subband full duplex configuration may include operations, features, means, or instructions for receiving the subband full duplex configuration in radio resource control signaling.

In some examples of the method, UEs, and non-transitory computer-readable medium described herein, the first uplink subband may be associated with a first carrier of the one or more carriers and the first downlink subband may be associated with a second carrier of the one or more carriers.

In some examples of the method, UEs, and non-transitory computer-readable medium described herein, the second downlink subband may be associated with a first carrier of the one or more carriers, the second uplink subband may be associated with a second carrier of the one or more carriers, and the third downlink subband may be associated with a third carrier of the one or more carriers.

In some examples of the method, UEs, and non-transitory computer-readable medium described herein, the second set of resources may be associated with a precoder resource group and includes one or more non-contiguous frequency resources across the second downlink subband and the third downlink subband, and one or more contiguous frequency resources within the second downlink subband and the third downlink subband based on the precoder resource group being wideband.

In some examples of the method, UEs, and non-transitory computer-readable medium described herein, the second set of resources may be associated with a precoder resource group and excludes one or more non-contiguous frequency resources across the second downlink subband and the third downlink subband based on the precoder resource group being wideband.

A method for wireless communication by a network entity is described. The method may include obtaining capability signaling indicating whether a UE supports more than one downlink subband within one or more carriers associated with a subband full duplex operation, outputting signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and communicating one or more messages according to the subband full duplex configuration.

A network entity for wireless communication is described. The network entity may include one or more memories storing processor executable code, and one or more processors coupled with the one or more memories. The one or more processors may individually or collectively operable to execute the code to cause the network entity to obtain capability signaling indicating whether a UE supports more than one downlink subband within one or more carriers associated with a subband full duplex operation, output signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and communicate one or more messages according to the subband full duplex configuration.

Another network entity for wireless communication is described. The network entity may include means for obtaining capability signaling indicating whether a UE supports more than one downlink subband within one or more carriers associated with a subband full duplex operation, means for outputting signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and means for communicating one or more messages according to the subband full duplex configuration.

A non-transitory computer-readable medium storing code for wireless communication is described. The code may include instructions executable by one or more processors to obtain capability signaling indicating whether a UE supports more than one downlink subband within one or more carriers associated with a subband full duplex operation, output signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both, and communicate one or more messages according to the subband full duplex configuration.

In some examples of the method, network entities, and non-transitory computer-readable medium described herein, the first downlink subband and the first uplink subband may be separated by a first guard band, the second downlink subband and the second uplink subband may be separated by a second guard band and the second uplink subband and the third downlink subband may be separated by a third guard band, or both, according to the subband full duplex configuration.

Some examples of the method, network entities, and non-transitory computer-readable medium described herein may further include operations, features, means, or instructions for transmitting, using a first time resource, a first message of the one or more messages to the UE on the first downlink subband, the second downlink subband, or the third downlink subband, where the UE may be a first half duplex UE and receiving, using the first time resource, a second message of the one or more messages from a second UE on the first uplink subband or the second uplink subband, where the second UE may be a second half duplex UE.

In some examples of the method, network entities, and non-transitory computer-readable medium described herein, the capability signaling indicates that the UE supports more than one downlink subband within the one or more carriers associated with the subband full duplex operation.

In some examples of the method, network entities, and non-transitory computer-readable medium described herein, the communicating may include operations, features, means, or instructions for transmitting a first message of the one or more messages using a first resource of the second set of resources and receiving a second message of the one or more messages using a second resource of the second set of resources.

In some examples of the method, network entities, and non-transitory computer-readable medium described herein, the capability signaling indicates that the UE excludes support for more than one downlink subband within the one or more carriers associated with the subband full duplex operation.

In some examples of the method, network entities, and non-transitory computer-readable medium described herein, the communicating may include operations, features, means, or instructions for communicating via the first set of resources.

In some examples of the method, network entities, and non-transitory computer-readable medium described herein, the subband full duplex configuration excludes configuring of the second downlink subband, the third downlink subband, and the second uplink subband based on the capability signaling indicating that the UE excludes support for more than one downlink subband within the one or more carriers.

Some examples of the method, network entities, and non-transitory computer-readable medium described herein may further include operations, features, means, or instructions for transmitting second signaling indicating a first CSI-RS resource associated with the second downlink subband and a second CSI-RS resource associated with the third downlink subband, where the first CSI-RS resource and the second CSI-RS resource may be linked.

Some examples of the method, network entities, and non-transitory computer-readable medium described herein may further include operations, features, means, or instructions for transmitting second signaling indicating a CSI-RS resource that includes non-contiguous resources within the second downlink subband and the third downlink subband.

Some examples of the method, network entities, and non-transitory computer-readable medium described herein may further include operations, features, means, or instructions for transmitting second signaling indicating a CSI-RS resource that includes contiguous resources that span across the second downlink subband and the third downlink subband.

Some examples of the method, network entities, and non-transitory computer-readable medium described herein may further include operations, features, means, or instructions for receiving respective reports indicating one or more cross link interference received signal strength indicator measurements in the second downlink subband and the third downlink subband, where each downlink subband includes one or more cross link interference received signal strength indicator resources.

Some examples of the method, network entities, and non-transitory computer-readable medium described herein may further include operations, features, means, or instructions for receiving a report indicating one or more cross link interference received signal strength indication measurements in the first downlink subband, the second downlink subband, the third downlink subband, or any combination thereof.

Some examples of the method, network entities, and non-transitory computer-readable medium described herein may further include operations, features, means, or instructions for receiving a report indicating one or more cross link interference received signal strength indication measurements based on a cross link interference received signal strength indicator resource that includes non-contiguous resources in the second downlink subband and the third downlink subband.

In some examples of the method, network entities, and non-transitory computer-readable medium described herein, transmitting the subband full duplex configuration may include operations, features, means, or instructions for transmitting the subband full duplex configuration in radio resource control signaling.

In some examples of the method, network entities, and non-transitory computer-readable medium described herein, the first uplink subband may be associated with a first carrier of the one or more carriers and the first downlink subband may be associated with a second carrier of the one or more carriers.

In some examples of the method, network entities, and non-transitory computer-readable medium described herein, the second downlink subband may be associated with a first carrier of the one or more carriers, the second uplink subband may be associated with a second carrier of the one or more carriers, and the third downlink subband may be associated with a third carrier of the one or more carriers

DETAILED DESCRIPTION

Figure 1:
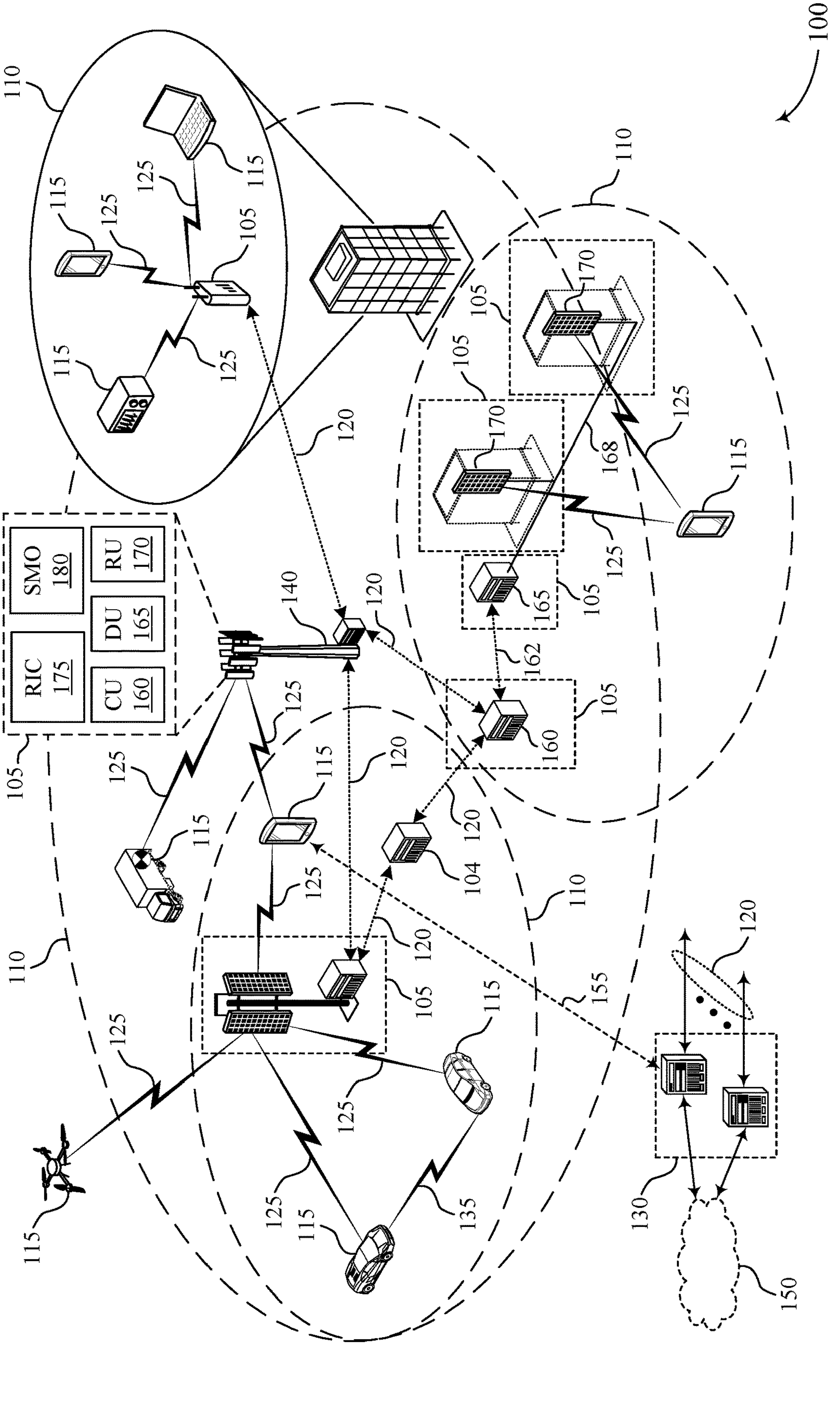
FIG. 1 shows an example of a wireless communications system that supports variable subband locations for subband full duplex (SBFD) configurations in accordance with one or more aspects of the present disclosure.

In some cases, a user equipment (UE) may be capable of full duplex operation. For example, the full-duplex operation may be subband full duplex (SBFD) operation, in which a portion of one or more carriers is uplink (UL) and one or more other portions of the one or more carriers are configured for downlink (DL). An UL subband may be located on the side of the one or more carriers (e.g., when there is no adjacent channel near the UL subband) or the UL subband may be located between (e.g., in the middle of) multiple DL subbands. The or more carriers may include a single DL subband or multiple DL subbands. Further, the UE may receive a first SBFD configuration (e.g., for a first set of resources) associated with a single DL subband and a second SBFD configuration (e.g., for a second set of resources) associated with multiple (e.g., two) DL subbands. The first and second SBFD configurations may be received in the same or different configuration messages. For example, the UE may receive a SBFD configuration that configures a first group of resources with a single DL subband and a second group of resources with at least multiple DL subbands. However, the UE may not support a SBFD configuration associated with multiple DL subbands. For example, processing for the SBFD configuration associated with the multiple DL subbands may be more complex than processing for the SBFD configuration associated with the single downlink subband.

In some cases, a UE may indicate (e.g., to a network node) whether it is capable of supporting a SBFD configuration associated with multiple DL subbands. For instance, the UE may be capable of full duplex operation. For example, the full-duplex operation may be SBFD operation, in which a portion of the one or more carriers is UL and one or more other portions of the carrier are configured for DL. An UL subband may be located on the side of the carrier (e.g., when there is no adjacent channel near the UL subband) or the UL subband may be located in the middle part of the carrier (e.g., the UL subband in the middle may reduce adjacent channel inter-gNB channel cross link interference). Further, the UE may receive a first SBFD configuration associated with a single DL subband and a second SBFD configuration associated with multiple (e.g., two, more than two) DL subbands, or a SBFD configuration that configures a first group of resources with a single DL subband and a second group of resources with at least multiple DL subbands. However, the UE may not support an SBFD configuration associated with the multiple DL subbands. For example, processing for the SBFD configuration associated with the multiple DL subbands may be more complex than processing for the SBFD configuration associated with the single DL subband.

Aspects of the disclosure are initially described in the context of wireless communications systems. Aspects of the disclosure are further illustrated by and described with reference to apparatus diagrams, system diagrams, and flowcharts that relate to variable subband locations for subband full duplex configurations.

FIG. 1 shows an example of a wireless communications system 100 that supports variable subband locations for subband full duplex configurations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support variable subband locations for subband full duplex configurations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple DL component carriers and one or more UL component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include DL transmissions (e.g., forward link transmissions) from a network entity 105 to a UE 115, UL transmissions (e.g., return link transmissions) from a UE 115 to a network entity 105, or both, among other configurations of transmissions. Carriers may carry DL or UL communications (e.g., in an FDD mode) or may be configured to carry DL and UL communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a DL carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include DL transmissions, UL transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, a UE 115 may be capable of full duplex operation. For example, the full duplex operation may include SBFD operation, in which a portion of one or more carriers is UL and one or more other portions of the carrier are configured for DL (e.g., for a given time resource such as a slot or symbol). An UL subband may be located on the side of the carrier (e.g., when there is no adjacent channel near the UL subband) or the UL subband may be located between (e.g., in the middle of) multiple DL subbands. For instance, the one or more carriers may include a single DL subband or multiple DL subbands. Further, the UE 115 may receive a first SBFD configuration from a network entity 105 associated with a single DL subband and/or a second SBFD configuration associated multiple (e.g., two, more than two)

DL subbands. In some instances, the UE 115 may receive a SBFD configuration that configures a first group of resources with at least a single DL subband and a second group of resources with at least multiple DL subbands. However, the UE 115 may not support an SBFD configuration associated with the multiple DL subbands. For example, processing for the SBFD configuration associated with the multiple DL subbands may be more complex than processing for the SBFD configuration associated with the single DL subband.

In some cases, a UE 115 may indicate to a network entity 105 whether it is capable of supporting a SBFD configuration associated with multiple DL subbands. In some of these cases, the UE 115 may support more than one DL subband within one or more carriers. The UE 115 may indicate (e.g., transmit capability signaling) that it supports more than one DL subband within the carrier. The SBFD configuration associated with a single DL subband may be a baseline option (e.g., supported by all UEs), while the SBFD configuration associated with the multiple DL subbands may be an optional UE feature. Thus, the UE 115 may communicate according to either SBFD configuration.

In some other cases, the UE 115 may not support, but may still receive, a SBFD configuration (e.g., SBFD time and frequency configuration) associated with multiple DL subbands (e.g., in a cell-common SBFD configuration signaled to multiple UEs 115 in a cell). In these cases, the UE 115 may ignore (e.g., suppress communication via) the SBFD configuration associated with multiple DL subbands.

Figure 2:
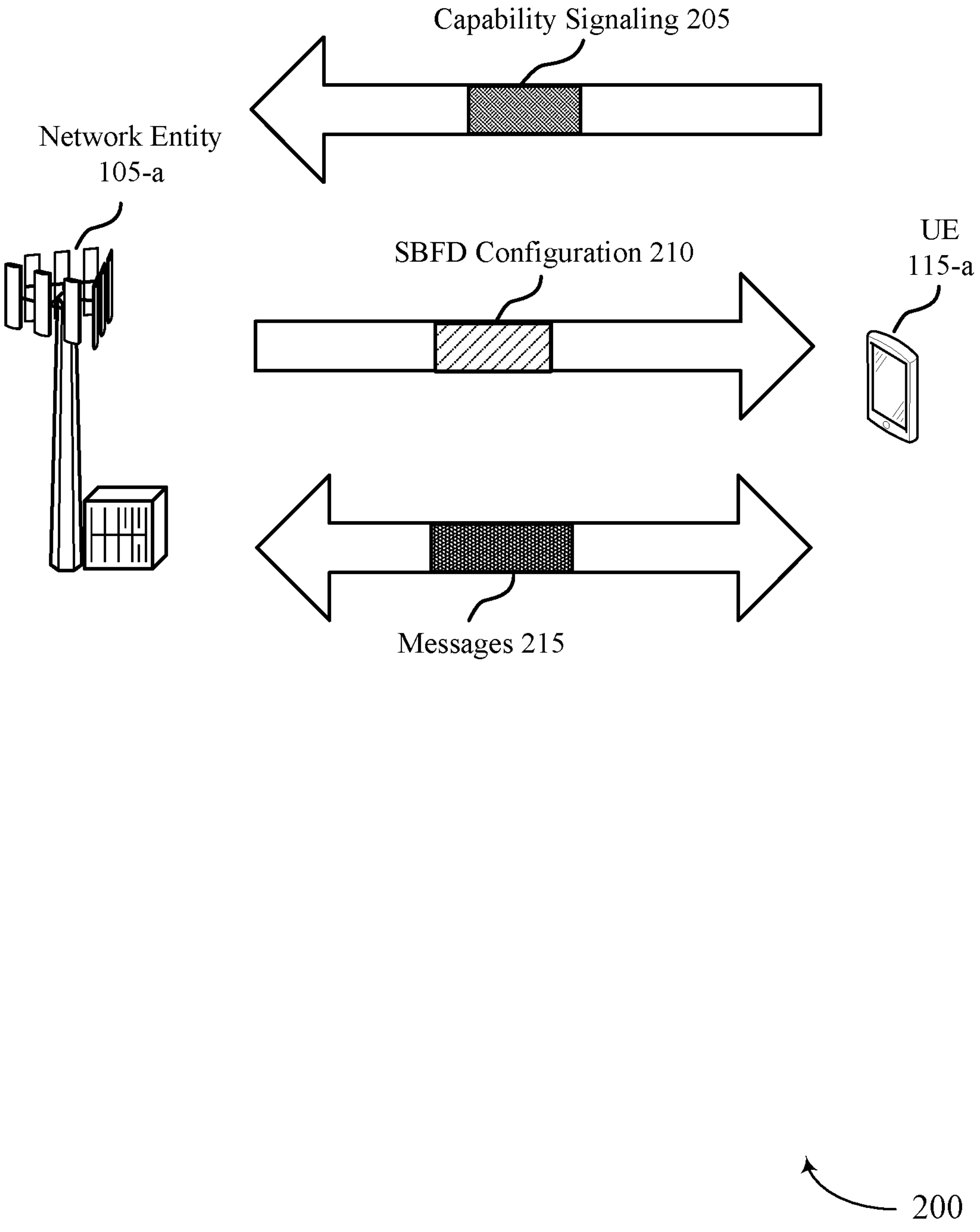
FIG. 2 shows an example of a wireless communications system that supports variable subband locations for SBFD configurations in accordance with one or more aspects of the present disclosure.

FIG. 2 shows an example of a wireless communications system 200 that supports variable subband locations for subband full duplex configurations in accordance with one or more aspects of the present disclosure. The wireless communications system 200 may implement, or be implemented by, aspects of the wireless communications system 100. For example, the wireless communications system may include a network entity 105-*a* (e.g., a network node) and a UE 115-*a*, which may be examples of a network entity 105 and a UE 115, respectively, as described with reference to FIG. 1.

The wireless communications system 200 may support SBFD communication between the UE 115-*a* and the network entity 105-*a*. For example, the UE 115-*a* may operate in a SBFD mode across one or more carriers (e.g., one or more carriers associated with a SBFD operation), where the UE 115-*a* may support an SBFD configuration with one or more DL subbands. Further, in SBFD operations, one or more carriers may be configured for full duplex communications. In some instances, the one or more carriers may carry DL and UL communications (e.g., may be configured in a TDD mode). For example, the one or more carriers may include one or more groups of resources (e.g., one or more slots, one or more symbols) that may be divided into DL resources, UL resources, flexible resources, or any combination thereof (where one or more of the DL resources or flexible resources may be configured for SBFD operation).

In some instances, the UE 115-*a* may support SBFD configurations associated with a single DL subband or multiple DL subbands within the one or more carriers (e.g., one or more TDD carriers where each carrier has at least some DL configured resources). However, the UE 115-*a* may not support the SBFD configuration associated with multiple DL subbands. For example, processing for an SBFD configuration associated with multiple DL subbands may be more complex than processing for a SBFD configuration associated with a single DL subband.

In some cases, the UE 115-*a* may transmit capability signaling 205. For example, the UE 115-*a* may transmit the capability signaling to the network entity 105-*a* indicating whether the UE 115-*a* supports more than one DL subband within the one or more carriers. For instance, the capability signaling 205 may indicate whether the UE 115-*a* supports an SBFD configuration associated with multiple DL subbands on legacy D symbols, legacy F symbols, or both. Additionally, or alternatively, the capability signaling 205 may indicate whether the UE 115-*a* supports the SBFD configuration associated with the multiple DL subbands within a specified time frame (e.g., one or more time resources including one or more slots, one or more symbols, or both). In some instances, the capability signaling 205 may indicate that the UE 115-*a* supports more than one DL subband (e.g., the UE 115-*a* is capable of supporting a SBFD configuration associated with multiple DL subbands within the one or more carriers associated with the SBFD operation). In some other instances, the UE 115-*a* may indicate that the UE 115-*a* excludes support for more than one DL subband (e.g., the UE 115-*a* is not capable of supporting a SBFD configuration associated with multiple DL subbands within the one or more carriers associated with the SBFD operation).

In some cases, the UE 115-*a* may receive a SBFD configuration 210. For example, the UE 115-*a* may receive the SBFD configuration 210 from a network entity 105-*a* based on the capability signaling 205 associated with the UE 115-*a*. The SBFD configuration 210 may configure a group of resources (e.g., of the one or more carriers) with a single DL subband (e.g., a first DL subband) and a single UL subband (e.g., a first UL subband). Additionally, or alternatively, the SBFD configuration 210 may configure the same or a different group of resources (e.g., of the one or more carriers), with multiple DL subbands (e.g., a second DL subband and a third DL subband) separated by at least a single UL subband (e.g., a second UL subband). For instance, the SBFD configuration 210 may be associated with a single or multiple DL subbands. The UE 115-*a* may receive the SBFD configuration 210 through RRC signaling.

In some cases, the UE 115-*a* may communicate one or more messages 215 according to the SBFD configuration 210. Additionally, or alternatively, the network entity 105-*a* may communicate one or more messages 215 according to the SBFD configuration 210. For instance, the UE 115-*a* may transmit messages to, and receive messages from, the network entity 105-*a*.

In some cases, the UE 115-*a* may be a half duplex UE. In these cases, the network entity 105-*a* may transmit a first message 215 on a DL subband to the UE 115-*a* (e.g., a first half duplex UE). Additionally, or alternatively, the network entity 105-*a* may receive a second message 215 on an UL subband from a different UE 115 (e.g., a second half duplex UE). The UE may receive the first and second messages 215 on the same or different time resources.

In a first example, the capability signaling 205 may indicate that the UE 115-*a* supports multiple (e.g., two, more than two) DL subbands. The network entity 105-*a* may transmit a SBFD configuration 210 that configures a group of resources (e.g., a second set of resources) with multiple DL subbands. For instance, the SBFD configuration 210 may configure a group of resources (e.g., a set of slots or symbols) of one or more carriers with multiple DL subbands separated by an UL subband. The UE 115-*a* and the network entity 105-*a* may communicate according to the SBFD configuration 210. For example, the UE 115-*a* may transmit a message 215 (e.g., a first message) using a resource (e.g., a first resource) of the group of resources. Additionally, or alternatively, the UE 115-*a* may receive a message 215 (e.g., a second message) using a resource (e.g., a second resource) of the group of resources.

In a second example, the capability signaling 205 may indicate that the UE 115-*a* does not support multiple (e.g., more than one) DL subbands. The network entity 105-*a* may transmit a SBFD configuration 210 that configures a group of resources (e.g., a first set of resources) with a single DL subband. For instance, the SBFD configuration 210 is associated with a single DL subband and a single UL subband. The UE 115-*a* and the network entity 105-*a* may communicate according to the SBFD configuration 210 via a group of resources (e.g., a first set of resources). Additionally, or alternatively, the UE 115-*a* may refrain from communicating using resources configured with multiple DL subbands based on the UE 115-*a* excluding support for more than one DL subband within the one or more carriers.

In some cases, the UE 115-*a* may receive a SBFD configuration 210 configuring one or more resources with multiple DL subbands (e.g., an SBFD time and frequency configuration for more than one DL subband) even when the UE 115-*a* does not support a SBFD configuration associated with multiple DL subbands. For example, the network entity 105-*a* may transmit the SBFD configuration 210 in a cell-common SBFD configuration signaling to multiple UEs (e.g., all of the UEs) in a respective cell. In these cases, the UE 115-*a* may ignore the SBFD configuration 210 for the resources configured with multiple DL subbands. Additionally, or alternatively, the UE 115-*a* may ignore the SBFD configuration 210 altogether. For instance, the UE 115-*a* may not expect to receive a SBFD configuration 210 associated with multiple DL subbands. The UE 115-*a* may follow legacy UE behavior on resources (e.g., symbols, slots, etc.) configured with multiple DL subbands by the SBFD configuration 210.

Figure 3:
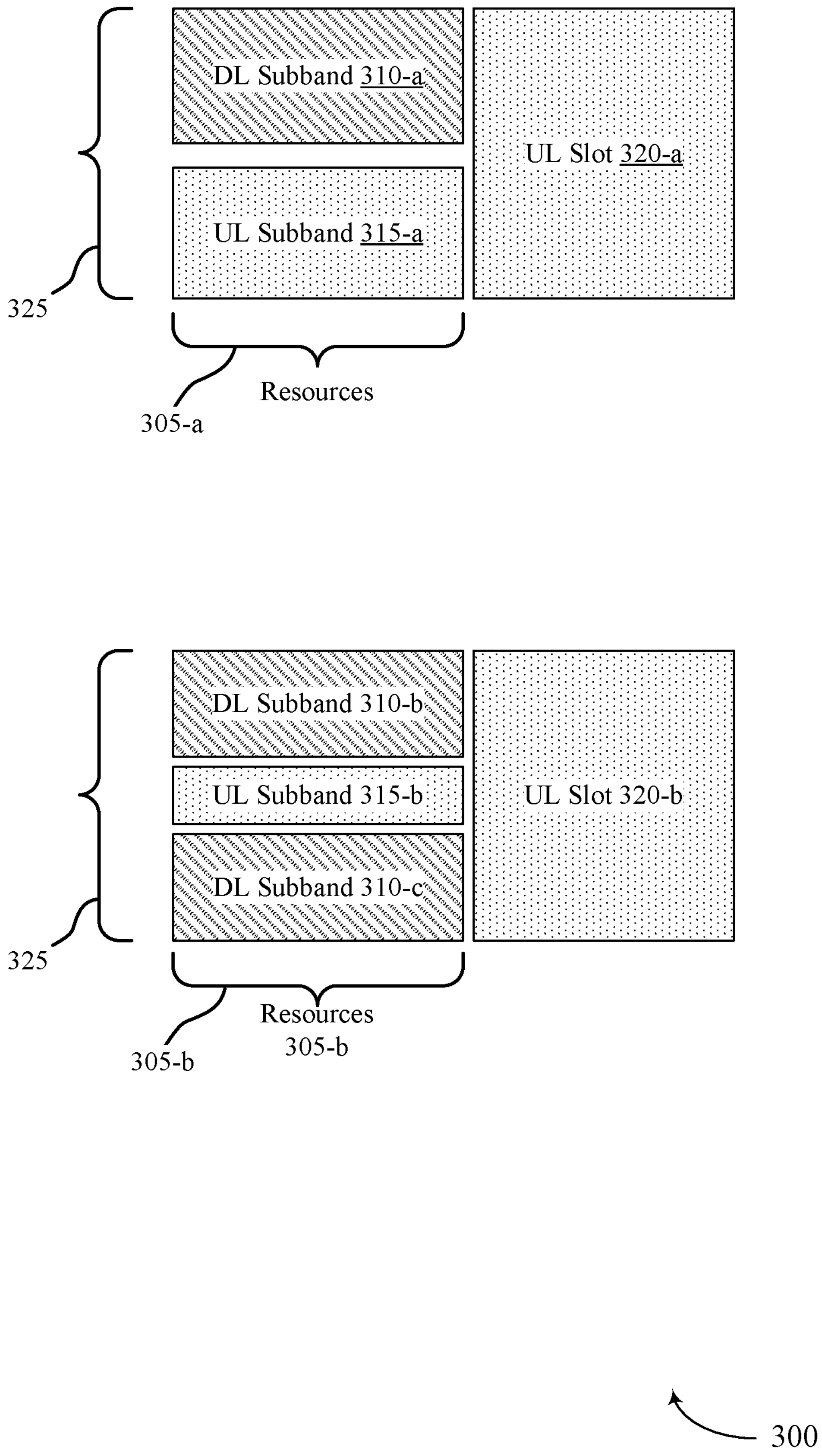
FIG. 3 shows an example of a wireless communications system that supports variable subband locations for SBFD configurations in accordance with one or more aspects of the present disclosure.

FIG. 3 shows an example of a wireless communications system 300 that supports variable subband locations for subband full duplex configurations in accordance with one or more aspects of the present disclosure. In some examples, the wireless communications system 300 may implement or be implemented by aspects of the wireless communications system 100 and the wireless communications system 200.

In some cases, a UE (e.g., a UE 115-*a* as described with reference to FIG. 2) may transmit capability signaling indicating whether the UE supports more than one DL subband within one or more carriers associated with a SBFD operation. For example, the UE may indicate that the UE supports more than one DL subband. Additionally, or alternatively, the UE may indicate that the UE 115 excludes support for more than one DL subband.

In some cases, a network node (e.g., a network entity 105-*a* as described with reference to FIG. 2) may transmit an SBFD configuration. The SBFD configuration may configure one or more resources based on the capability signaling obtained from, and associated with, the UE. For example, the SBFD configuration may configure resources 305-*a* (e.g., a first set of resources of one or more carriers 325) with a DL subband 310-*a* (e.g., a first DL subband), an UL subband 315-*a* (e.g., a first UL subband), and an UL slot 320-*a*. In other words, the SBFD configuration may be associated with a single DL subband 310-*a*. The UL subband 315-*a* may be located on the side of the one or more carriers. For instance, the UL subband 315-*a* may be located on the side of one or more carriers when there is no adjacent channel (e.g., no carrier or subband used for communication) on the same side as the UL subband 315-*a*. The DL subband 310-*a* may associated with a first carrier (e.g., of the one or more carriers 325) and the UL subband 315-*a* may be associated with a second carrier (e.g., of the one or more carriers 325). Additionally, or alternatively, the DL subband 310-*a* and the UL subband 315-*a* may be associated with a same carrier of the one or more carriers 325.

In some cases, the SBFD configuration may configure resources 305-*b* (e.g., a second set of resources of the one or more carriers 325) with a DL subband 310-*b* (e.g., a second DL subband), an UL subband 315-*b* (e.g., a second UL subband), a DL subband 310-*c* (e.g., a third DL subband), and an UL slot 320-*b*. For instance, the UL subband 315-*b* may be located between DL subbands of the one or more carriers 325. The UL subband 315-*b* may separate the DL subband 310-*b* and the DL subband 310-*c*. For instance, the UL subband 315-*b* may be located in the middle of one or more carriers when there is an adjacent channel. In these instances, the UL subband 315-*b* may reduce adjacent channel inter-gNB cross link interference (CLI) impact. The DL subband 310-*b* may be associated with a first carrier (e.g., of the one or more carriers 325) while the UL subband may be associated with a second carrier (e.g., of the one or more carriers 325) and the DL subband may be associated with a third carrier (e.g., of the one or more carriers 325). In some instances, the DL subband 310-*b* may be associated with a different carrier as the UL subband 315-*b*, the DL subband 310-*c*, or both. Additionally, or alternatively, the DL subband 310-*b* may be associated with a same carrier as the UL subband 315-*b*, the DL subband 310-*c*, or both.

In some cases, one or more guard bands may separate each DL subband 310 from each UL subband 315. For example, a first guard band may separate the DL subband 310-*a* and the UL subband 315-*a*. Additionally, or alternatively, a second guard band may separate the DL subband 310-*b* and the UL subband 315-*b* and a third guard band may separate the UL subband 315-*b* and the DL subband 310-*c*. The SBFD configuration may configure the resources 305 with the one or more guard bands.

In some cases, the resources 305-*b* may be associated with a precoder resource group (PRG). The PRG may be wideband (e.g., a non-contiguous wideband PRG with a SBFD configuration associated with multiple non-contiguous DL subbands). In a first example, the resources 305-*b* may include one or more non-contiguous resources across the DL subband 310-*b* and the DL subband 310-*c*. Additionally, or alternatively, the resources 305-*b* may include one or more contiguous frequency resources within the DL subband 310-*b* and the DL subband 310-*c* based on the PRG being wideband. In a second example, the resources 305-*b* may exclude one or more non-contiguous resources across the DL subband 310-*b* and the DL subband 310-*c* based on the PRG being wideband. The first example may achieve better scheduling flexibility and a higher DL data rate when compared to the second example. However, the first example, may require a UE to handle multiple (e.g., two) non-contiguous segments of continuous resource blocks which may increase UE complexity when performing channel estimation measurements.

In some cases, a UE (e.g., a SBFD aware UE) may receive signaling (e.g., second signaling) a indicating frequency resource allocation associated with at least a channel state information reference signal (CSI-RS) across the DL subband 310-*b* and the DL subband 310-*c*. The signaling may not impact CSI-RS sequence generation.

In some cases, the signaling may indicate a first CSI-RS resource for the DL subband 310-*b* and a second CSI-RS resource for the DL subband 310-*c*. The first CSI-RS resource and the second CSI-RS resource may be linked (may be associated with each other for measurement purposes). In some instances, the UE may receive additional signaling (e.g., third signaling) linking the first CSI-RS resource and the second CSI-RS resource in the DL subband 310-*b* and the DL subband 310-*c*.

In some cases, the UE may receive signaling (e.g., second signaling) indicating frequency resource allocation associated with a single CSI-RS resource. For example, the signaling may indicate a CSI-RS resource that includes non-contiguous resources within the DL subband 310-*b* and the DL subband 310-*c*. In these cases, a new RRC structure may configure non-contiguous resource blocks for the single CSI-RS resource, which may increase the signaling overhead. In some other instances, the signaling may indicate a CSI-RS resource that includes contiguous resources spanning across the DL subband 310-*b* and the DL subband 310-*c*. In these instances, the UE may monitor for a CSI-RS based on excluding the UL subband 315-*b* (e.g., and one or more guard bands in-between the DL subband 310-*b* and the DL subband 310-*c*). The UE may exclude frequency resources outside of the DL subband 310-*b* and the DL subband 310-*c*. The UE may reuse existing signaling designs for CSI-RS resource configuration. Additionally, or alternatively, the signaling may resolve potential unaligned boundaries between CSI-RS resource configuration and one or more SBFD subbands. However, UE complexity may increase due to a UE capability associated with a maximum quantity of configured CSI-RS resources, processing non-contiguous CSI-RS, or both.

In some cases, a UE may transmit a report indicating CLI received signal strength indication (CLI-RSSI) measurements across the DL subband 310-*b*, the DL subband 310-*c*, or both. The UE may transmit the report a network node, a different UE, or both. For example, the UE may transmit respective reports (e.g., separate reports reports) indicating CLI-RSSI measurements in the DL subband 310-*b* and the DL subband 310-*c*. For instance, a SBFD configuration may configure the DL subband 310-*b* with one or more CLI-RSSI measurement resources and the DL subband 310-*c* with one or more CLI-RSSI measurement resources (e.g., each DL subband 310 has one or more CLI-RSSI measurement resources). In another example, the UE may transmit a report (e.g., a single report) indicating CLI-RSSI measurements. The UE may transmit the report in the DL subband 310-*a*, the DL subband 310-*b*, the DL subband 310-*c*, or any combination thereof. In some other examples, the UE may transmit a report indicating CLI-RSSI measurements based on a CLI-RSSI comprising non-contiguous resources in the DL subband 310-*b* and the DL subband 310-*c*.

Figure 4:
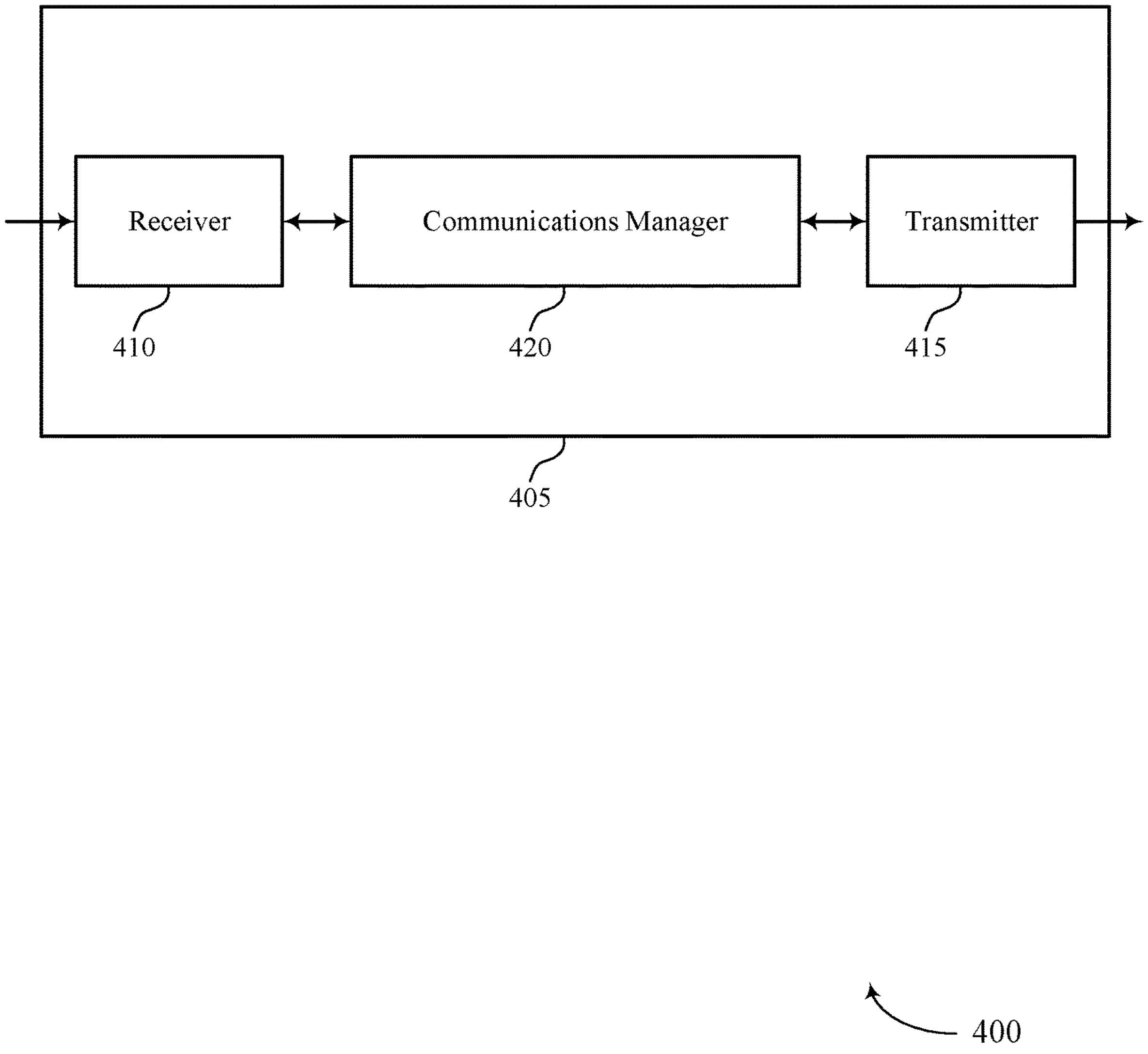
FIGS. 4 and 5 show block diagrams of devices that support variable subband locations for SBFD configurations in accordance with one or more aspects of the present disclosure.

FIG. 4 shows a block diagram 400 of a device 405 that supports variable subband locations for subband full duplex configurations in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. The device 405 may also include one or more processors, memory coupled with the one or more processors, and instructions stored in the memory that are executable by the one or more processors to enable the one or more processors to perform the SBFD configuration features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to variable subband locations for subband full duplex configurations). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to variable subband locations for subband full duplex configurations). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of variable subband locations for subband full duplex configurations as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication in accordance with examples as disclosed herein. For example, the communications manager 420 is capable of, configured to, or operable to support a means for transmitting capability signaling indicating whether the UE supports more than one DL subband within one or more carriers associated with a subband full duplex operation. The communications manager 420 is capable of, configured to, or operable to support a means for receiving signaling indicating a subband full duplex configuration based on the capability signaling associated with the UE, where the subband full duplex configuration configures a first set of resources of the one or more carriers with a first downlink subband and a first UL subband, or a second set of resources of the one or more carriers with a second DL subband and a third DL subband separated by at least a second UL subband, or both. The communications manager 420 is capable of, configured to, or operable to support a means for communicating one or more messages according to the subband full duplex configuration.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for more efficient utilization of communication resources.

Figure 5:
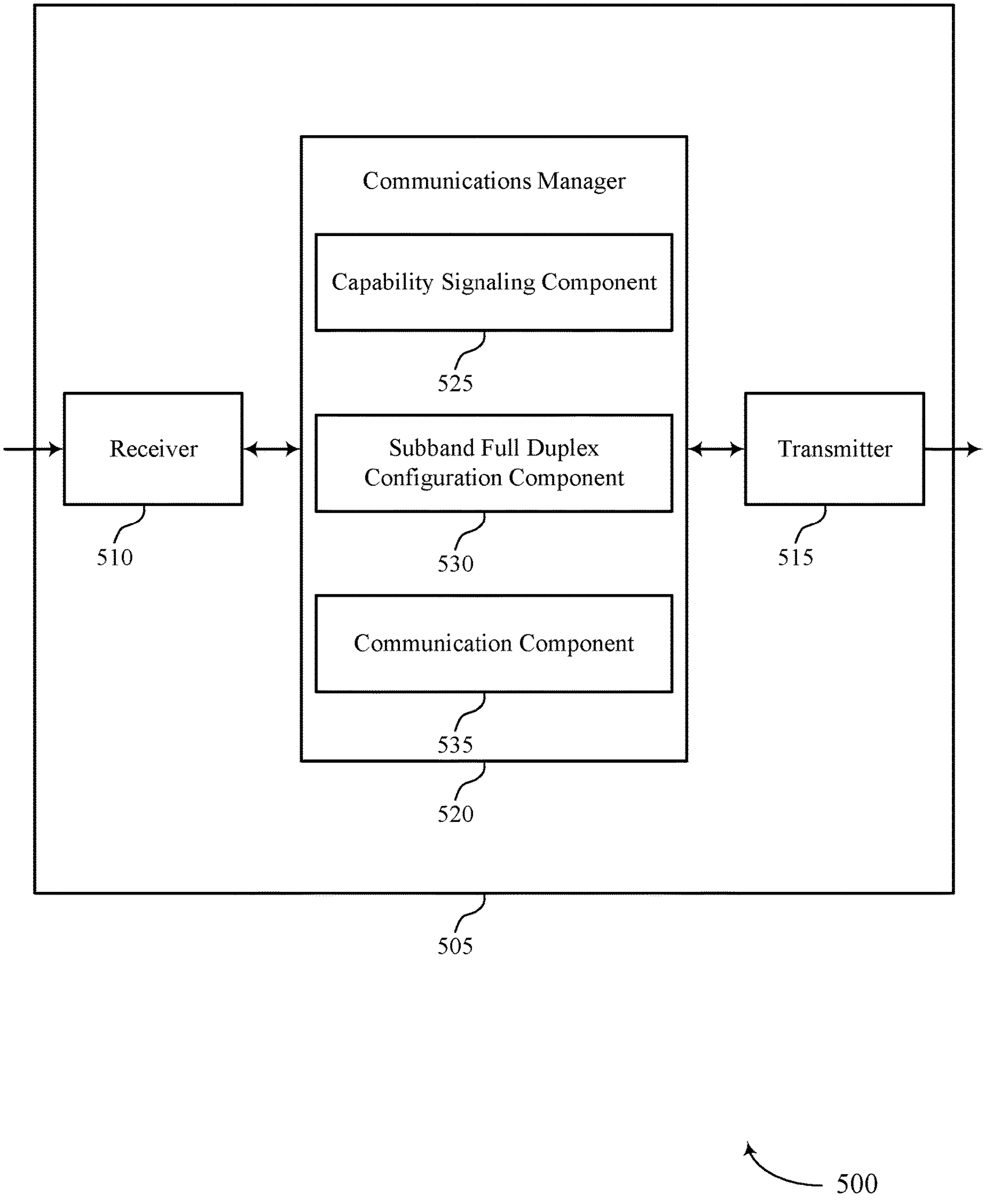

FIG. 5 shows a block diagram 500 of a device 505 that supports variable subband locations for subband full duplex configurations in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to variable subband locations for subband full duplex configurations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to variable subband locations for subband full duplex configurations). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of variable subband locations for subband full duplex configurations as described herein. For example, the communications manager 520 may include a capability signaling component 525, a subband full duplex configuration component 530, a communication component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The capability signaling component 525 is capable of, configured to, or operable to support a means for transmitting capability signaling indicating whether the UE supports more than one DL subband within one or more carriers associated with a subband full duplex operation. The subband full duplex configuration component 530 is capable of, configured to, or operable to support a means for receiving signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communication component 535 is capable of, configured to, or operable to support a means for communicating one or more messages according to the subband full duplex configuration.

In some cases, the capability signaling component 525, the subband full duplex configuration component 530, and the communication component 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the capability signaling component 525, the subband full duplex configuration component 530 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
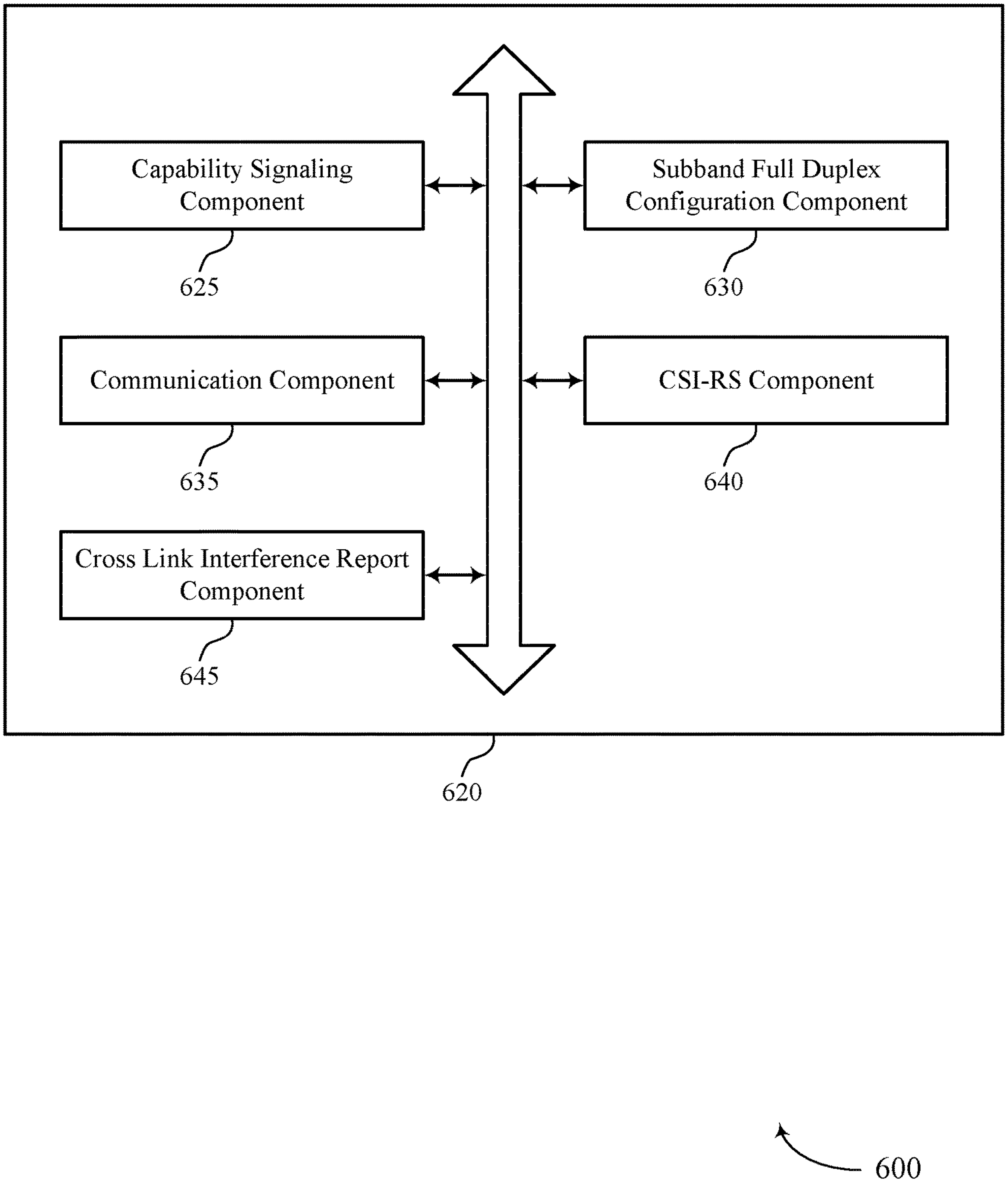
FIG. 6 shows a block diagram of a communications manager that supports variable subband locations for SBFD configurations in accordance with one or more aspects of the present disclosure.

FIG. 6 shows a block diagram 600 of a communications manager 620 that supports variable subband locations for subband full duplex configurations in accordance with one or more aspects of the present disclosure. The communications manager 620 may be an example of aspects of a communications manager 420, a communications manager 520, or both, as described herein. The communications manager 620, or various components thereof, may be an example of means for performing various aspects of variable subband locations for subband full duplex configurations as described herein. For example, the communications manager 620 may include a capability signaling component 625, a subband full duplex configuration component 630, a communication component 635, a CSI-RS component 640, a cross link interference report component 645, or any combination thereof. Each of these components, or components or subcomponents thereof (e.g., one or more processors, one or more memories), may communicate, directly or indirectly, with one another (e.g., via one or more buses).

The communications manager 620 may support wireless communication in accordance with examples as disclosed herein. The capability signaling component 625 is capable of, configured to, or operable to support a means for transmitting capability signaling indicating whether the UE supports more than one DL subband within one or more carriers associated with a subband full duplex operation. The subband full duplex configuration component 630 is capable of, configured to, or operable to support a means for receiving signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communication component 635 is capable of, configured to, or operable to support a means for communicating one or more messages according to the subband full duplex configuration.

In some examples, the first DL subband and the first UL subband are separated by a first guard band, the second DL subband and the second UL subband are separated by a second guard band and the second UL subband and the third DL subband are separated by a third guard band, or both, according to the subband full duplex configuration.

In some examples, the capability signaling indicates that the UE supports more than one DL subband within the one or more carriers associated with the subband full duplex operation.

In some examples, to support communicating, the communication component 635 is capable of, configured to, or operable to support a means for transmitting a first message of the one or more messages using a first resource of the second set of resources. In some examples, to support communicating, the communication component 635 is capable of, configured to, or operable to support a means for receiving a second message of the one or more messages using a second resource of the second set of resources.

In some examples, the capability signaling indicates that the UE excludes support for more than one DL subband within the one or more carriers associated with the subband full duplex operation.

In some examples, to support communicating, the communication component 635 is capable of, configured to, or operable to support a means for communicating via the first set of resources.

In some examples, to support communicating, the communication component 635 is capable of, configured to, or operable to support a means for refrain from communicating via the second set of resources based on the UE excluding support for more than one DL subband within the one or more carriers.

In some examples, the CSI-RS component 640 is capable of, configured to, or operable to support a means for receiving second signaling indicating a first CSI-RS resource associated with the second DL subband and a second CSI-RS resource associated with the third DL subband, where the first CSI-RS resource and the second CSI-RS resource are linked.

In some examples, the CSI-RS component 640 is capable of, configured to, or operable to support a means for receiving second signaling indicating a CSI-RS resource that includes non-contiguous resources within the second DL subband and the third DL subband.

In some examples, the CSI-RS component 640 is capable of, configured to, or operable to support a means for receiving second signaling indicating a CSI-RS resource that includes contiguous resources that span across the second DL subband and the third DL subband. In some examples, the CSI-RS component 640 is capable of, configured to, or operable to support a means for monitoring for a CSI-RS based on excluding the second UL subband and one or more guard bands in-between the second DL subband and the third DL subband.

In some examples, the cross link interference report component 645 is capable of, configured to, or operable to support a means for transmitting respective reports indicating one or more cross link interference received signal strength indicator measurements in the second DL subband and the third DL subband, where each DL subband includes one or more cross link interference received signal strength indicator resources.

In some examples, the cross link interference report component 645 is capable of, configured to, or operable to support a means for transmitting a report indicating one or more cross link interference received signal strength indication measurements in the first DL subband, the second DL subband, the third DL subband, or any combination thereof.

In some examples, the cross link interference report component 645 is capable of, configured to, or operable to support a means for transmitting a report indicating one or more cross link interference received signal strength indication measurements based on a cross link interference received signal strength indicator resource that includes non-contiguous resources in the second DL subband and the third DL subband.

In some examples, to support receiving the subband full duplex configuration, the subband full duplex configuration component 630 is capable of, configured to, or operable to support a means for receiving the subband full duplex configuration in radio resource control signaling.

In some examples, the first UL subband is associated with a first carrier of the one or more carriers and the first DL subband is associated with a second carrier of the one or more carriers.

In some examples, the second downlink subband is associated with a first carrier of the one or more carriers, the second UL subband is associated with a second carrier of the one or more carriers, and the third DL subband is associated with a third carrier of the one or more carriers.

In some examples, the second set of resources is associated with a precoder resource group and includes one or more non-contiguous frequency resources across the second DL subband and the third DL subband, and one or more contiguous frequency resources within the second DL subband and the third DL subband based on the precoder resource group being wideband.

In some examples, the second set of resources is associated with a precoder resource group and excludes one or more non-contiguous frequency resources across the second DL subband and the third DL subband based on the precoder resource group being wideband.

In some cases, the capability signaling component 625, the subband full duplex configuration component 630, the communication component 635, the CSI-RS component 640, and the cross link interference report component 645 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the capability signaling component 625, the subband full duplex configuration component 630, the communication component 635, the CSI-RS component 640, and the cross link interference report component 645 discussed herein.

Figure 7:
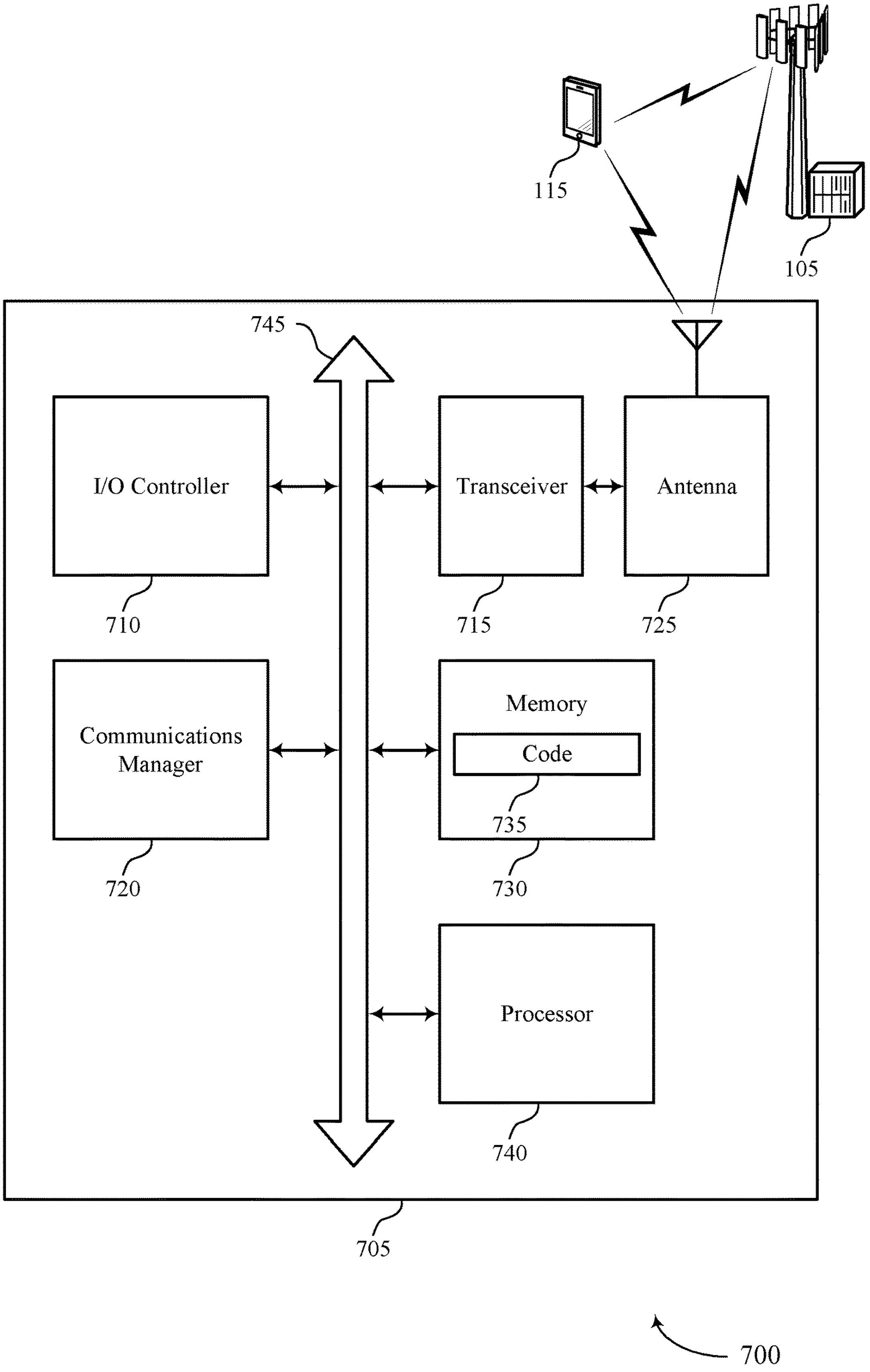
FIG. 7 shows a diagram of a system including a device that supports variable subband locations for SBFD configurations in accordance with one or more aspects of the present disclosure.

FIG. 7 shows a diagram of a system 700 including a device 705 that supports variable subband locations for subband full duplex configurations in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting variable UL subband locations for subband full duplex configurations). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communication in accordance with examples as disclosed herein. For example, the communications manager 720 is capable of, configured to, or operable to support a means for transmitting capability signaling indicating whether the UE supports more than one DL subband within one or more carriers associated with a subband full duplex operation. The communications manager 720 is capable of, configured to, or operable to support a means for receiving signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communications manager 720 is capable of, configured to, or operable to support a means for communicating one or more messages according to the subband full duplex configuration.

By including or configuring the communications manager 720 in accordance with examples as described herein, the device 705 may support techniques for improved communication reliability, reduced latency, more efficient utilization of communication resources, improved coordination between devices, improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of variable UL subband locations for subband full duplex configurations as described herein, or the at least one processor 740 and the at least one memory 730 may be otherwise configured to, individually or collectively, perform or support such operations.

Figure 8:
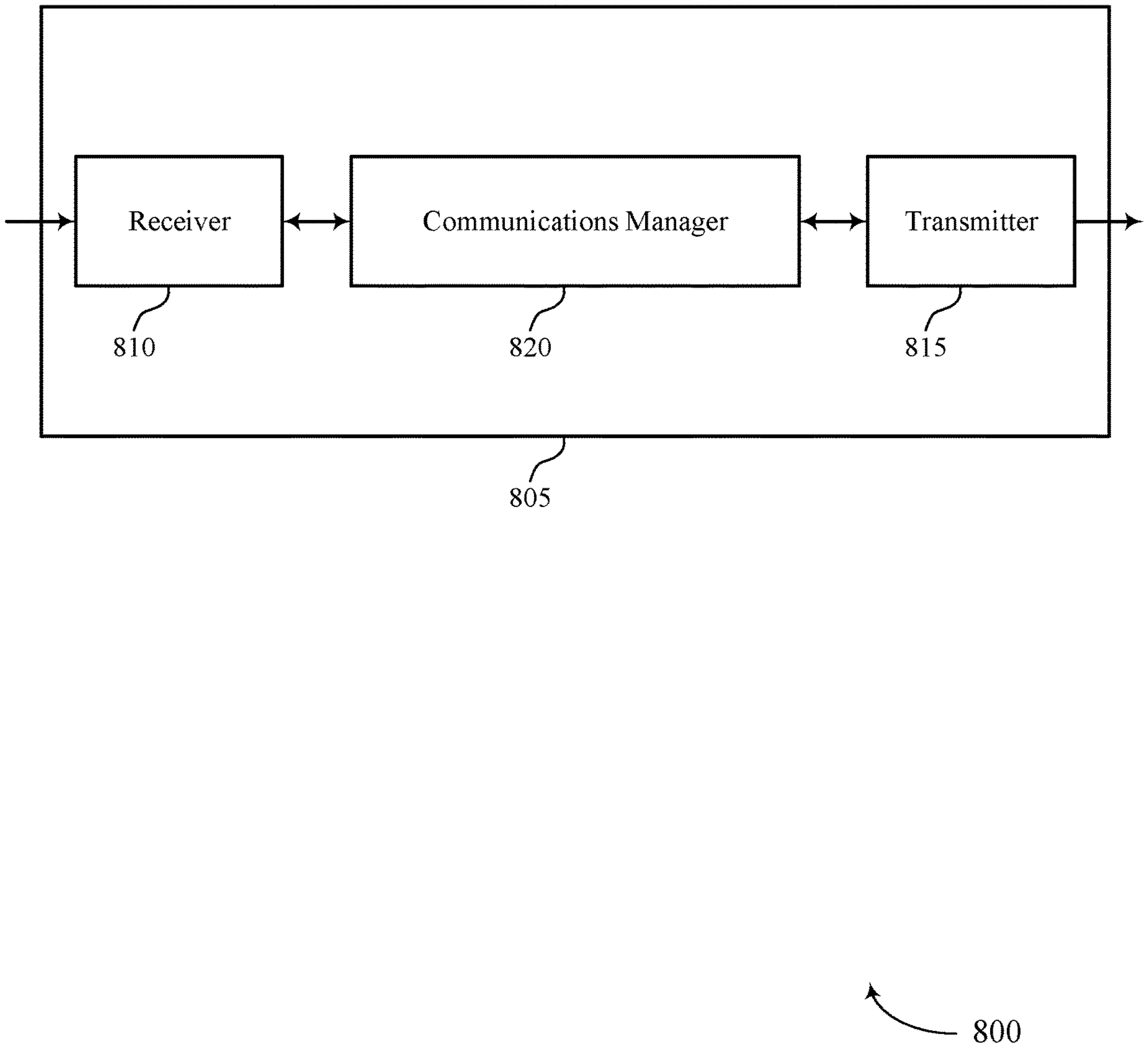
FIGS. 8 and 9 show block diagrams of devices that support variable subband locations for SBFD configurations in accordance with one or more aspects of the present disclosure.

FIG. 8 shows a block diagram 800 of a device 805 that supports variable UL subband locations for subband full duplex configurations in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of variable UL subband locations for subband full duplex configurations as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for obtaining capability signaling indicating whether a UE supports more than one DL subband within one or more carriers associated with a subband full duplex operation. The communications manager 820 is capable of, configured to, or operable to support a means for outputting signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communications manager 820 is capable of, configured to, or operable to support a means for communicating one or more messages according to the subband full duplex configuration.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources.

Figure 9:
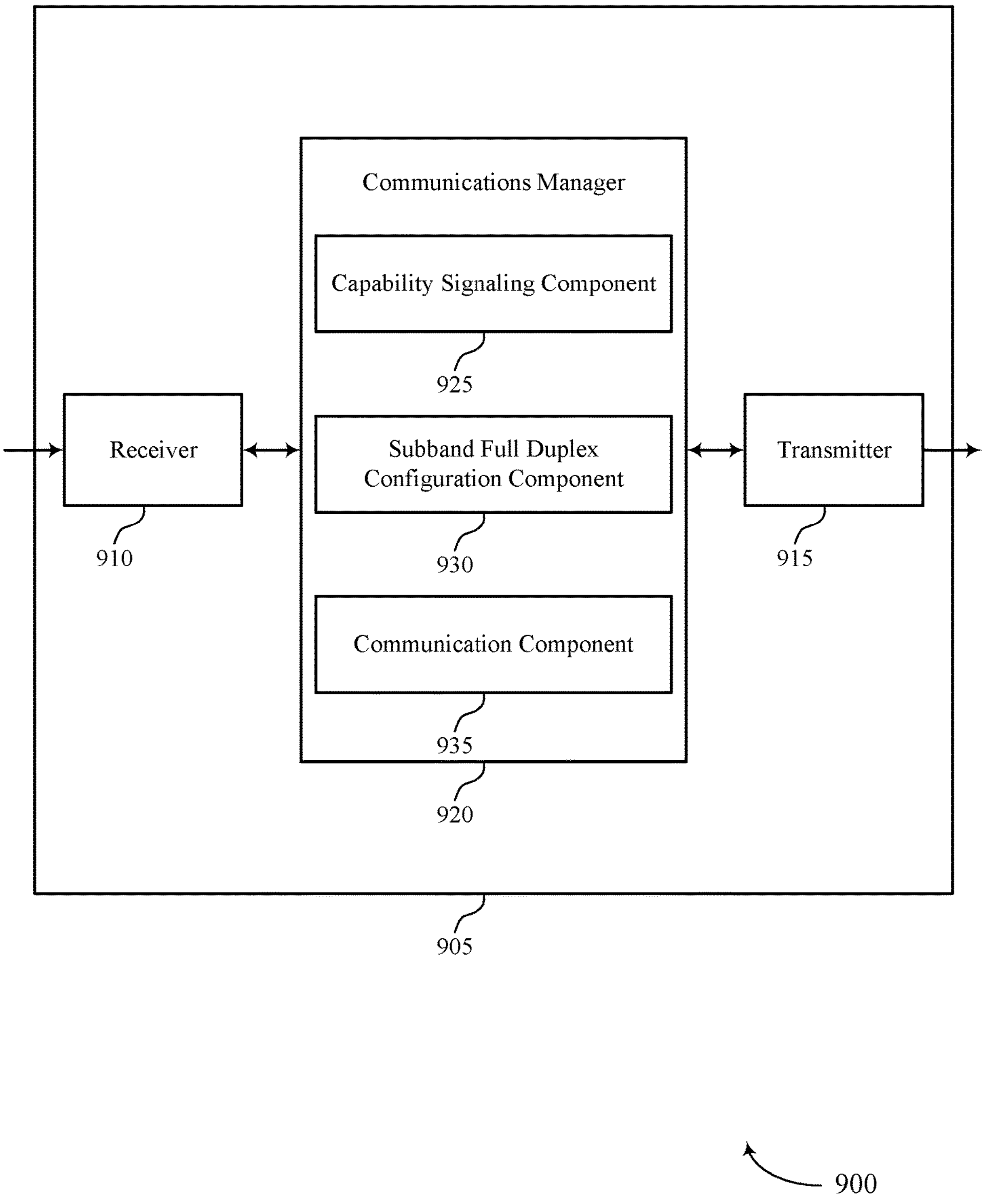

FIG. 9 shows a block diagram 900 of a device 905 that supports variable UL subband locations for subband full duplex configurations in accordance with one or more aspects of the present disclosure. The device 905 may be an example of aspects of a device 805 or a network entity 105 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of variable UL subband locations for subband full duplex configurations as described herein. For example, the communications manager 920 may include a capability signaling component 925, a subband full duplex configuration component 930, a communication component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The capability signaling component 925 is capable of, configured to, or operable to support a means for obtaining capability signaling indicating whether a UE supports more than one DL subband within one or more carriers associated with a subband full duplex operation. The subband full duplex configuration component 930 is capable of, configured to, or operable to support a means for outputting signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communication component 935 is capable of, configured to, or operable to support a means for communicating one or more messages according to the subband full duplex configuration.

Figure 10:
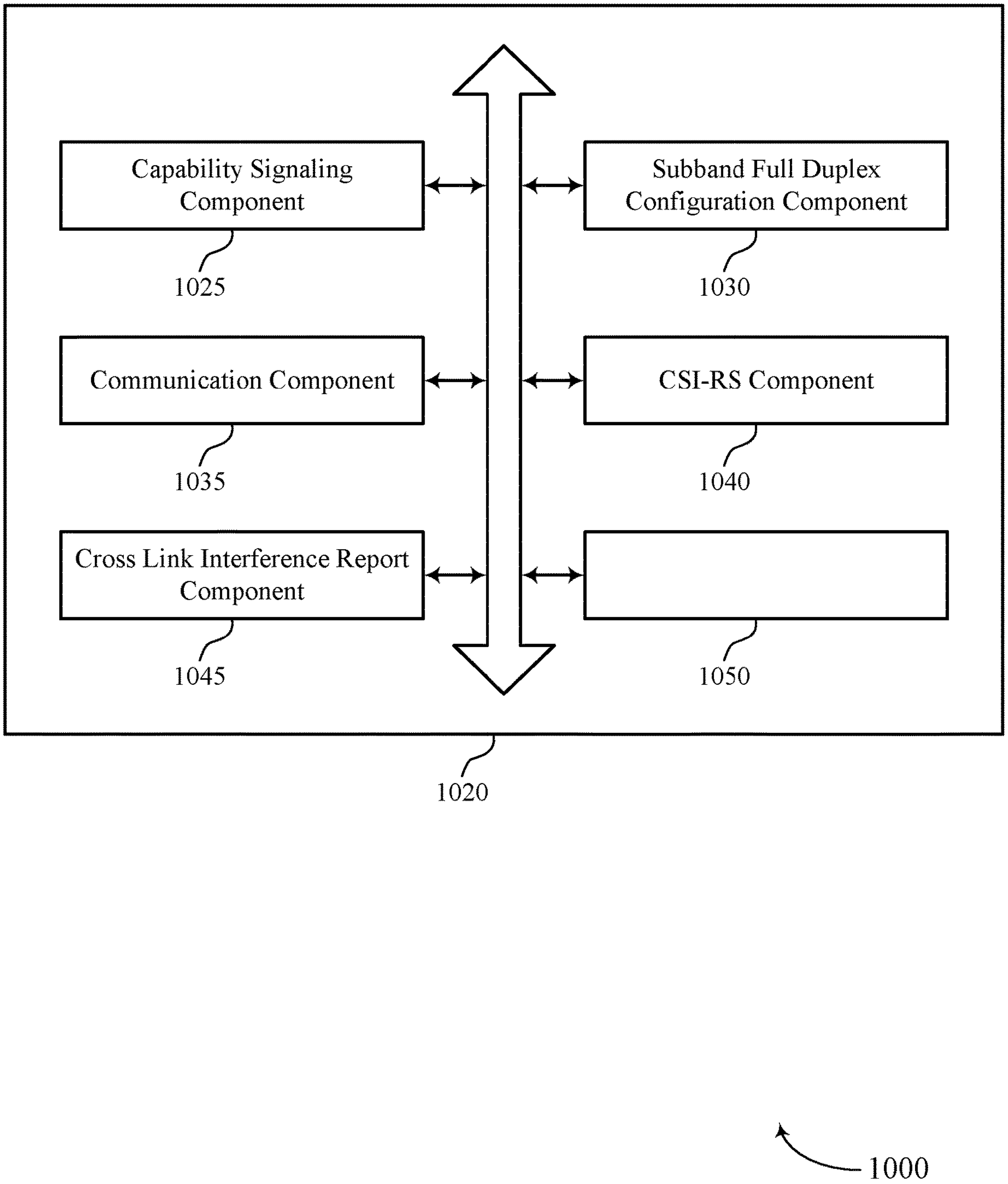
FIG. 10 shows a block diagram of a communications manager that supports variable subband locations for SBFD configurations in accordance with one or more aspects of the present disclosure.

FIG. 10 shows a block diagram 1000 of a communications manager 1020 that supports variable UL subband locations for subband full duplex configurations in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of variable UL subband locations for subband full duplex configurations as described herein. For example, the communications manager 1020 may include a capability signaling component 1025, a subband full duplex configuration component 1030, a communication component 1035, a CSI-RS component 1040, a cross link interference report component 1045, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication in accordance with examples as disclosed herein. The capability signaling component 1025 is capable of, configured to, or operable to support a means for obtaining capability signaling indicating whether a UE supports more than one DL subband within one or more carriers associated with a subband full duplex operation. The subband full duplex configuration component 1030 is capable of, configured to, or operable to support a means for outputting signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communication component 1035 is capable of, configured to, or operable to support a means for communicating one or more messages according to the subband full duplex configuration.

In some examples, the first DL subband and the first UL subband are separated by a first guard band, the second DL subband and the second UL subband are separated by a second guard band and the second UL subband and the third DL subband are separated by a third guard band, or both, according to the subband full duplex configuration.

In some examples, the communication component 1035 is capable of, configured to, or operable to support a means for transmitting, using a first time resource, a first message of the one or more messages to the UE on the first DL subband, the second DL subband, or the third DL subband, where the UE is a first half duplex UE. In some examples, the communication component 1035 is capable of, configured to, or operable to support a means for receiving, using the first time resource, a second message of the one or more messages from a second UE on the first UL subband or the second UL subband, where the second UE is a second half duplex UE.

In some examples, the capability signaling indicates that the UE supports more than one DL subband within the one or more carriers associated with the subband full duplex operation.

In some examples, to support communicating, the communication component 1035 is capable of, configured to, or operable to support a means for transmitting a first message of the one or more messages using a first resource of the second set of resources. In some examples, to support communicating, the communication component 1035 is capable of, configured to, or operable to support a means for receiving a second message of the one or more messages using a second resource of the second set of resources.

In some examples, the capability signaling indicates that the UE excludes support for more than one DL subband within the one or more carriers associated with the subband full duplex operation.

In some examples, to support communicating, the communication component 1035 is capable of, configured to, or operable to support a means for communicating via the first set of resources.

In some examples, the subband full duplex configuration excludes configuring of the second DL subband, the third DL subband, and the second UL subband based on the capability signaling indicating that the UE excludes support for more than one DL subband within the one or more carriers.

In some examples, the CSI-RS component 1040 is capable of, configured to, or operable to support a means for transmitting second signaling indicating a first CSI-RS resource associated with the second DL subband and a second CSI-RS resource associated with the third DL subband, where the first CSI-RS resource and the second CSI-RS resource are linked.

In some examples, the CSI-RS component 1040 is capable of, configured to, or operable to support a means for transmitting second signaling indicating a CSI-RS resource that includes non-contiguous resources within the second DL subband and the third DL subband.

In some examples, the CSI-RS component 1040 is capable of, configured to, or operable to support a means for transmitting second signaling indicating a CSI-RS resource that includes contiguous resources that span across the second DL subband and the third DL subband.

In some examples, the cross link interference report component 1045 is capable of, configured to, or operable to support a means for receiving respective reports indicating one or more cross link interference received signal strength indicator measurements in the second DL subband and the third DL subband, where each DL subband includes one or more cross link interference received signal strength indicator resources.

In some examples, the cross link interference report component 1045 is capable of, configured to, or operable to support a means for receiving a report indicating one or more cross link interference received signal strength indication measurements in the first DL subband, the second DL subband, the third DL subband, or any combination thereof.

In some examples, the 1050 is capable of, configured to, or operable to support a means for receiving a report indicating one or more cross link interference received signal strength indication measurements based on a cross link interference received signal strength indicator resource that includes non-contiguous resources in the second DL subband and the third DL subband.

In some examples, to support transmitting the subband full duplex configuration, the subband full duplex configuration component 1030 is capable of, configured to, or operable to support a means for transmitting the subband full duplex configuration in radio resource control signaling.

In some examples, the first UL subband is associated with a first carrier of the one or more carriers and the first DL subband is associated with a second carrier of the one or more carriers.

In some examples, the second DL subband is associated with a first carrier of the one or more carriers, the second UL subband is associated with a second carrier of the one or more carriers, and the third DL subband is associated with a third carrier of the one or more carriers.

Figure 11:
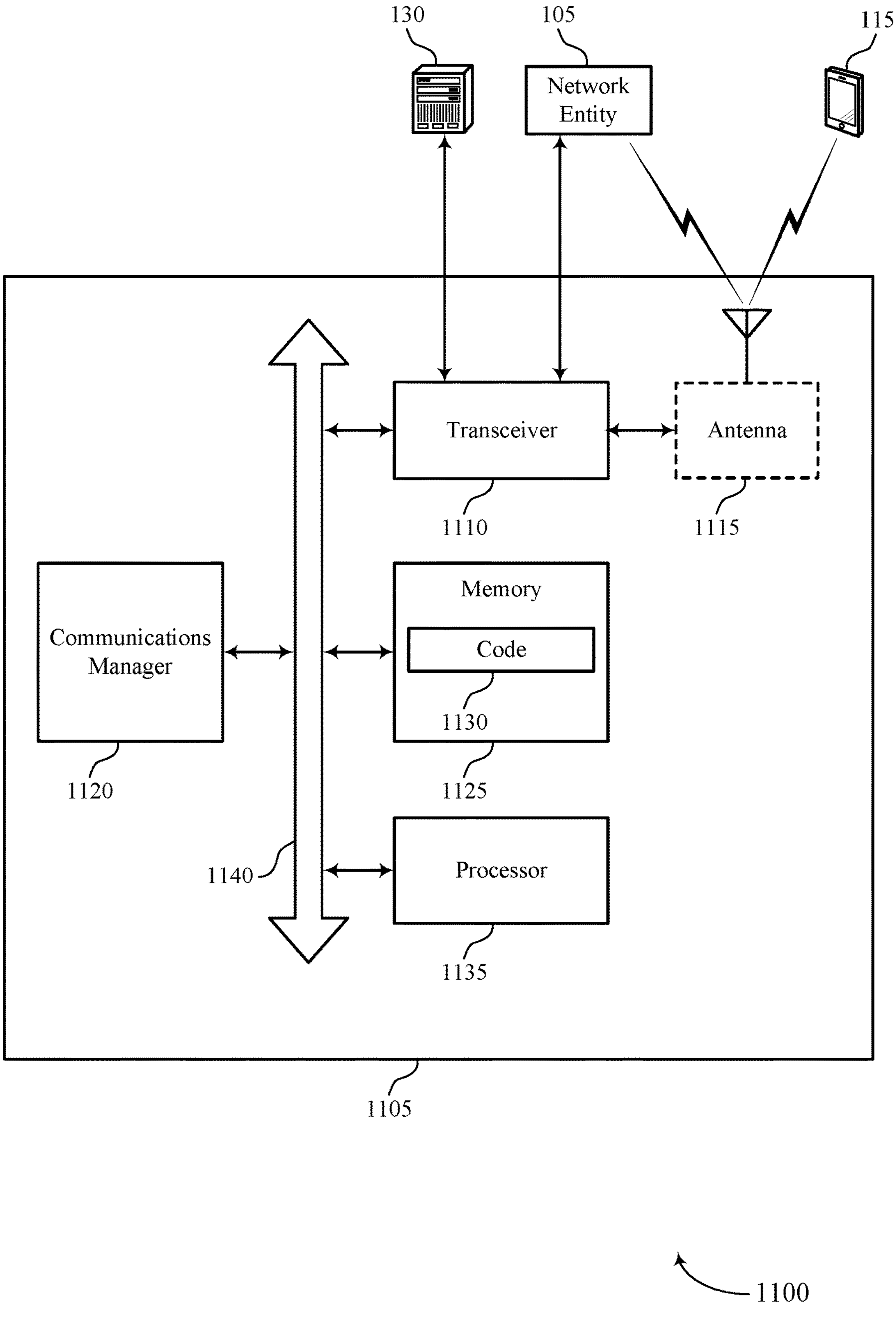
FIG. 11 shows a diagram of a system including a device that supports variable subband locations for SBFD configurations in accordance with one or more aspects of the present disclosure.

FIG. 11 shows a diagram of a system 1100 including a device 1105 that supports variable UL subband locations for subband full duplex configurations in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting variable UL subband locations for subband full duplex configurations). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication in accordance with examples as disclosed herein. For example, the communications manager 1120 is capable of, configured to, or operable to support a means for obtaining capability signaling indicating whether a UE supports more than one DL subband within one or more carriers associated with a subband full duplex operation. The communications manager 1120 is capable of, configured to, or operable to support a means for outputting signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The communications manager 1120 is capable of, configured to, or operable to support a means for communicating one or more messages according to the subband full duplex configuration.

By including or configuring the communications manager 1120 in accordance with examples as described herein, the device 1105 may support techniques for improved communication reliability, reduced latency, more efficient utilization of communication resources, improved coordination between devices, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of variable UL subband locations for subband full duplex configurations as described herein, or the at least one processor 1135 and the at least one memory 1125 may be otherwise configured to, individually or collectively, perform or support such operations.

Figure 12:
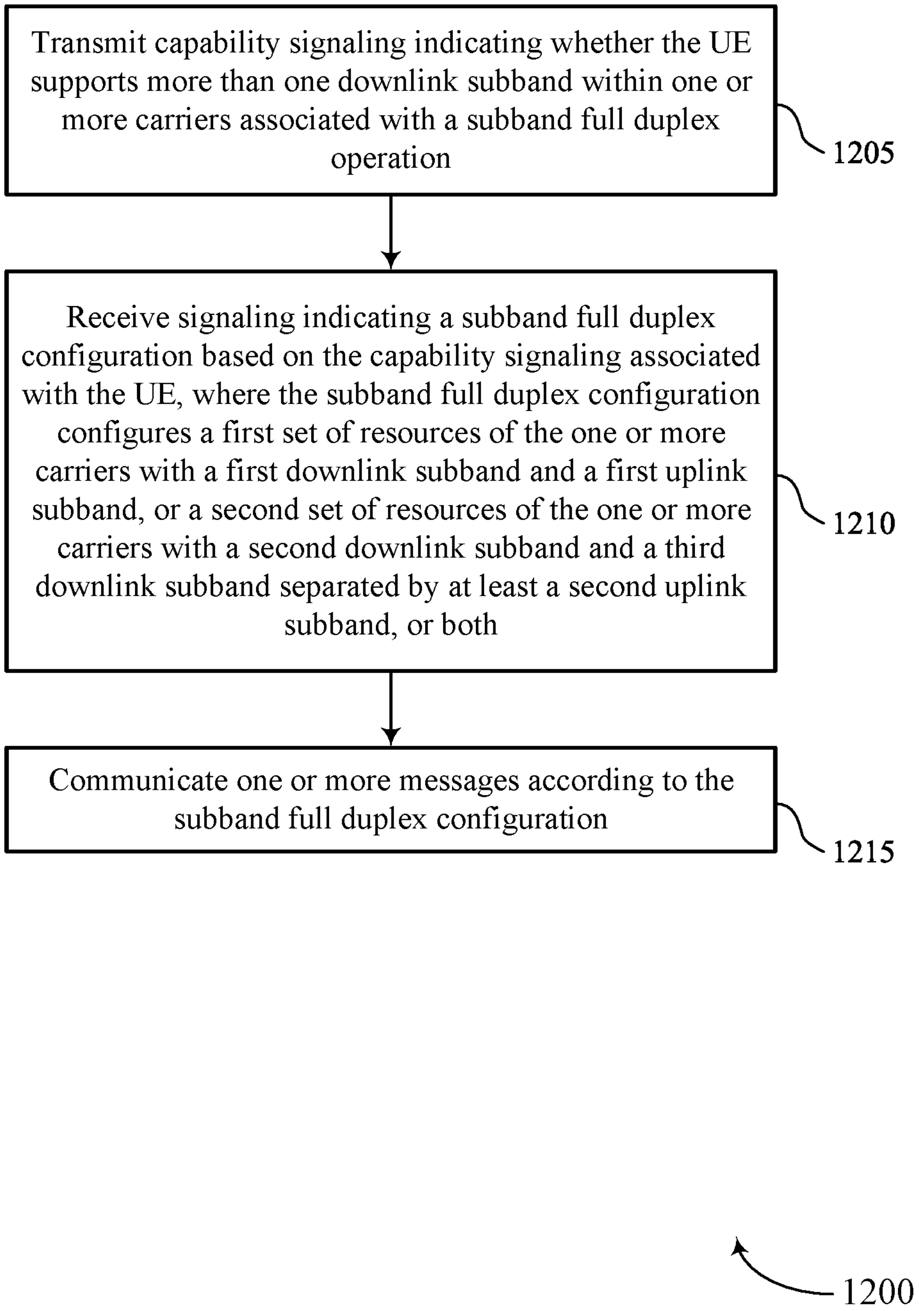
FIGS. 12 and 13 show a flowcharts illustrating methods that support variable subband locations for SBFD configurations in accordance with one or more aspects of the present disclosure.

FIG. 12 shows a flowchart illustrating a method 1200 that supports variable UL subband locations for subband full duplex configurations in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting capability signaling indicating whether the UE supports more than one DL subband within one or more carriers associated with a subband full duplex operation. The operations of block 1205 may be performed in accordance with examples as disclosed herein. In some examples, aspects of the operations of 1205 may be performed by a capability signaling component 625 as described with reference to FIG. 6.

At 1210, the method may include receiving signaling indicating a subband full duplex configuration based on the capability signaling associated with the UE, where the subband full duplex configuration configures a first set of resources of the one or more carriers with a first DL subband and a first UL subband, or a second set of resources of the one or more carriers with a second DL subband and a third DL subband separated by at least a second UL subband, or both. The operations of block 1210 may be performed in accordance with examples as disclosed herein. In some examples, aspects of the operations of 1210 may be performed by a subband full duplex configuration component 630 as described with reference to FIG. 6.

At 1215, the method may include communicating one or more messages according to the subband full duplex configuration. The operations of block 1215 may be performed in accordance with examples as disclosed herein. In some examples, aspects of the operations of 1215 may be performed by a communication component 635 as described with reference to FIG. 6.

Figure 13:
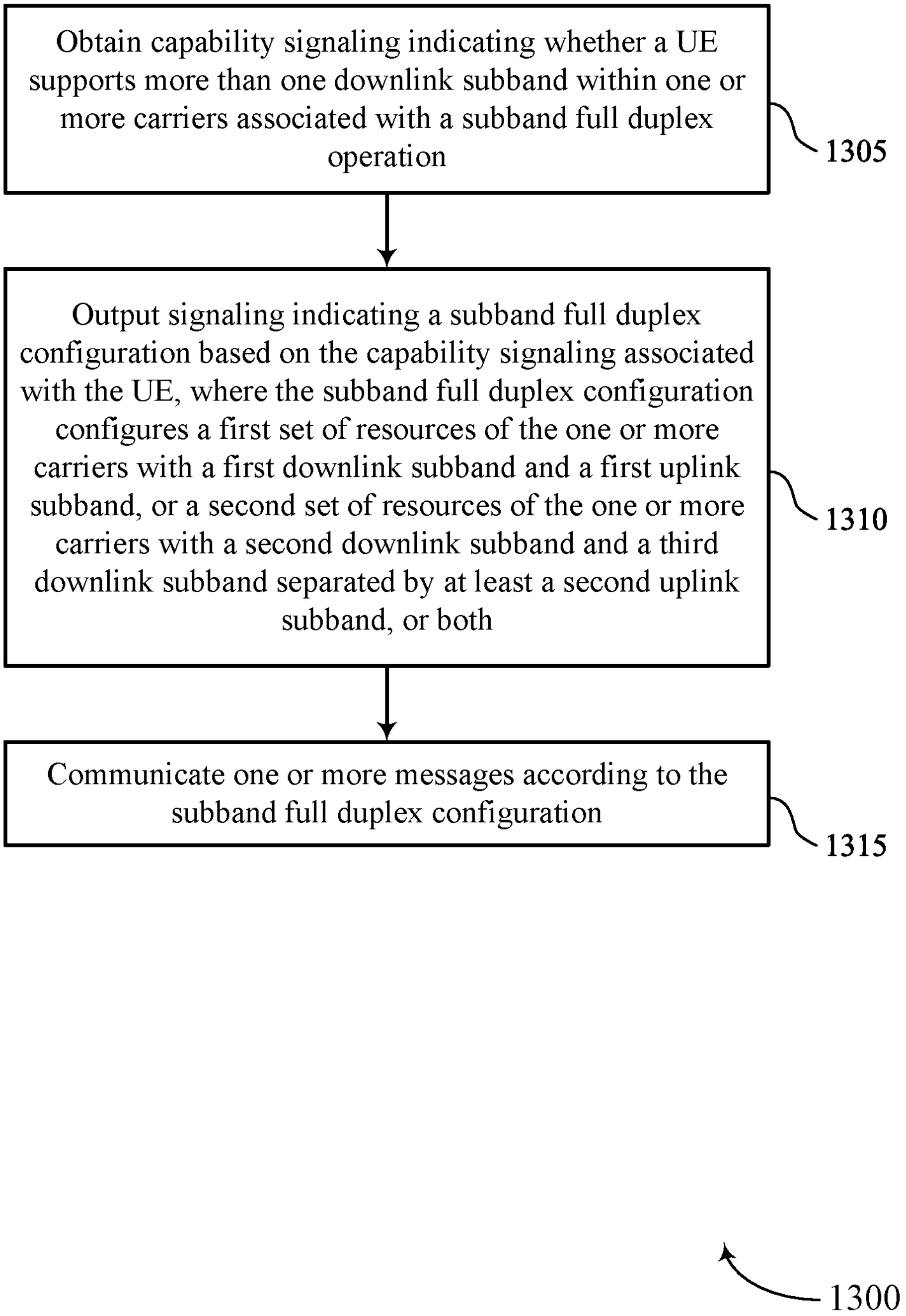

FIG. 13 shows a flowchart illustrating a method 1300 that supports variable uplink subband locations for subband full duplex configurations in accordance with aspects of the present disclosure. The operations of the method 1300 may be implemented by a network node or its components as described herein. For example, the operations of the method 1300 may be performed by a network node as described with reference to FIGS. 1 through 3 and 8 through 11. In some examples, a network node may execute a set of instructions to control the functional elements of the network node to perform the described functions. Additionally, or alternatively, the network node may perform aspects of the described functions using special-purpose hardware.

At 1305, the method may include obtaining capability signaling indicating whether a UE supports more than one downlink subband within one or more carriers associated with a subband full duplex operation. The operations of block 1305 may be performed in accordance with examples as disclosed herein. In some examples, aspects of the operations of 1305 may be performed by a capability signaling component 1025 as described with reference to FIG. 10.

At 1310, the method may include outputting signaling indicating a subband full duplex configuration based on the capability signaling associated with the UE, where the subband full duplex configuration configures a first set of resources of the one or more carriers with a first downlink subband and a first uplink subband, or a second set of resources of the one or more carriers with a second downlink subband and a third downlink subband separated by at least a second uplink subband, or both. The operations of block 1310 may be performed in accordance with examples as disclosed herein. In some examples, aspects of the operations of 1310 may be performed by a subband full duplex configuration component 1030 as described with reference to FIG. 10.

At 1315, the method may include communicating one or more messages according to the subband full duplex configuration. The operations of block 1315 may be performed in accordance with examples as disclosed herein. In some examples, aspects of the operations of 1315 may be performed by a communication component 1035 as described with reference to FIG. 10.

The following provides an overview of aspects of the present disclosure:

Aspect 1: A method for wireless communication at a UE, comprising: transmitting capability signaling indicating whether the UE supports more than one downlink subband within one or more carriers associated with a subband full duplex operation; receiving signaling indicating a subband full duplex configuration based at least in part on the capability signaling associated with the UE, wherein the subband full duplex configuration configures a first set of resources of the one or more carriers with a first downlink subband and a first uplink subband, or a second set of resources of the one or more carriers with a second downlink subband and a third downlink subband separated by at least a second uplink subband, or both; and communicating one or more messages according to the subband full duplex configuration.

Aspect 2: The method of aspect 1, wherein the first downlink subband and the first uplink subband are separated by a first guard band, the second downlink subband and the second uplink subband are separated by a second guard band and the second uplink subband and the third downlink subband are separated by a third guard band, or both, according to the subband full duplex configuration.

Aspect 3: The method of any of aspects 1 through 2, wherein the capability signaling indicates that the UE supports more than one downlink subband within the one or more carriers associated with the subband full duplex operation.

Aspect 4: The method of aspect 3, wherein the communicating comprises: transmitting a first message of the one or more messages using a first resource of the second set of resources; or receiving a second message of the one or more messages using a second resource of the second set of resources.

Aspect 5: The method of any of aspects 1 through 2, wherein the capability signaling indicates that the UE excludes support for more than one downlink subband within the one or more carriers associated with the subband full duplex operation.

Aspect 6: The method of aspect 5, wherein the communicating comprises: communicating via the first set of resources.

Aspect 7: The method of aspect 6, wherein the communicating comprises: refrain from communicating via the second set of resources based at least in part on the UE excluding support for more than one downlink subband within the one or more carriers.

Aspect 8: The method of any of aspects 1 through 7, further comprising: receiving second signaling indicating a first CSI-RS resource associated with the second downlink subband and a second CSI-RS resource associated with the third downlink subband, wherein the first CSI-RS resource and the second CSI-RS resource are linked.

Aspect 9: The method of any of aspects 1 through 8, further comprising: receiving second signaling indicating a CSI-RS resource that comprises non-contiguous resources within the second downlink subband and the third downlink subband.

Aspect 10: The method of any of aspects 1 through 9, further comprising: receiving second signaling indicating a CSI-RS resource that comprises contiguous resources that span across the second downlink subband and the third downlink subband; and monitoring for a CSI-RS based at least in part on excluding the second uplink subband and one or more guard bands in-between the second downlink subband and the third downlink subband.

Aspect 11: The method of any of aspects 1 through 4 and 8 through 10, further comprising: transmitting respective reports indicating one or more cross link interference received signal strength indicator measurements in the second downlink subband and the third downlink subband, wherein each downlink subband comprises one or more cross link interference received signal strength indicator resources.

Aspect 12: The method of any of aspects 1 through 11, further comprising: transmitting a report indicating one or more cross link interference received signal strength indication measurements in the first downlink subband, the second downlink subband, the third downlink subband, or any combination thereof.

Aspect 13: The method of any of aspects 1 through 12, further comprising: transmitting a report indicating one or more cross link interference received signal strength indication measurements based at least in part on a cross link interference received signal strength indicator resource that comprises non-contiguous resources in the second downlink subband and the third downlink subband.

Aspect 14: The method of any of aspects 1 through 13, wherein receiving the subband full duplex configuration further comprises: receiving the subband full duplex configuration in radio resource control signaling.

Aspect 15: The method of any of aspects 1 through 14, wherein the first uplink subband is associated with a first carrier of the one or more carriers and the first downlink subband is associated with a second carrier of the one or more carriers.

Aspect 16: The method of any of aspects 1 through 15, wherein the second downlink subband is associated with a first carrier of the one or more carriers, the second uplink subband is associated with a second carrier of the one or more carriers, and the third downlink subband is associated with a third carrier of the one or more carriers.

Aspect 17: The method of any of aspects 1 through 16, wherein the second set of resources is associated with a precoder resource group and comprises one or more non-contiguous frequency resources across the second downlink subband and the third downlink subband, and one or more contiguous frequency resources within the second downlink subband and the third downlink subband based at least in part on the precoder resource group being wideband.

Aspect 18: The method of any of aspects 1 through 17, wherein the second set of resources is associated with a precoder resource group and excludes one or more non-contiguous frequency resources across the second downlink subband and the third downlink subband based at least in part on the precoder resource group being wideband.

Aspect 19: A method for wireless communication at a network entity, comprising: obtaining capability signaling indicating whether a UE supports more than one downlink subband within one or more carriers associated with a subband full duplex operation; outputting signaling indicating a subband full duplex configuration based at least in part on the capability signaling associated with the UE, wherein the subband full duplex configuration configures a first set of resources of the one or more carriers with a first downlink subband and a first uplink subband, or a second set of resources of the one or more carriers with a second downlink subband and a third downlink subband separated by at least a second uplink subband, or both; and communicating one or more messages according to the subband full duplex configuration.

Aspect 20: The method of aspect 19, wherein the first downlink subband and the first uplink subband are separated by a first guard band, the second downlink subband and the second uplink subband are separated by a second guard band and the second uplink subband and the third downlink subband are separated by a third guard band, or both, according to the subband full duplex configuration.

Aspect 21: The method of any of aspects 19 through 20, further comprising: transmitting, using a first time resource, a first message of the one or more messages to the UE on the first downlink subband, the second downlink subband, or the third downlink subband, wherein the UE is a first half duplex UE; and receiving, using the first time resource, a second message of the one or more messages from a second UE on the first uplink subband or the second uplink subband, wherein the second UE is a second half duplex UE.

Aspect 22: The method of any of aspects 19 through 21, wherein the capability signaling indicates that the UE supports more than one downlink subband within the one or more carriers associated with the subband full duplex operation.

Aspect 23: The method of aspect 22, wherein the communicating comprises: transmitting a first message of the one or more messages using a first resource of the second set of resources; or receiving a second message of the one or more messages using a second resource of the second set of resources.

Aspect 24: The method of any of aspects 19 through 21, wherein the capability signaling indicates that the UE excludes support for more than one downlink subband within the one or more carriers associated with the subband full duplex operation.

Aspect 25: The method of aspect 24, wherein the communicating comprises: communicating via the first set of resources.

Aspect 26: The method of any of aspects 19 through 21 and 24 through 25, wherein the subband full duplex configuration excludes configuring of the second downlink subband, the third downlink subband, and the second uplink subband based at least in part on the capability signaling indicating that the UE excludes support for more than one downlink subband within the one or more carriers.

Aspect 27: The method of any of aspects 19 through 23, further comprising: transmitting second signaling indicating a first CSI-RS resource associated with the second downlink subband and a second CSI-RS resource associated with the third downlink subband, wherein the first CSI-RS resource and the second CSI-RS resource are linked.

Aspect 28: The method of any of aspects 19 through 27, further comprising: transmitting second signaling indicating a CSI-RS resource that comprises non-contiguous resources within the second downlink subband and the third downlink subband.

Aspect 29: The method of any of aspects 19 through 28, further comprising: transmitting second signaling indicating a CSI-RS resource that comprises contiguous resources that span across the second downlink subband and the third downlink subband.

Aspect 30: The method of any of aspects 19 through 29, further comprising: receiving respective reports indicating one or more cross link interference received signal strength indicator measurements in the second downlink subband and the third downlink subband, wherein each downlink subband comprises one or more cross link interference received signal strength indicator resources.

Aspect 31: The method of any of aspects 19 through 30, further comprising: receiving a report indicating one or more cross link interference received signal strength indication measurements in the first downlink subband, the second downlink subband, the third downlink subband, or any combination thereof.

Aspect 32: The method of any of aspects 19 through 31, further comprising: receiving a report indicating one or more cross link interference received signal strength indication measurements based at least in part on a cross link interference received signal strength indicator resource that comprises non-contiguous resources in the second downlink subband and the third downlink subband.

Aspect 33: The method of any of aspects 19 through 32, wherein transmitting the subband full duplex configuration further comprises: transmitting the subband full duplex configuration in radio resource control signaling.

Aspect 34: The method of any of aspects 19 through 33, wherein the first uplink subband is associated with a first carrier of the one or more carriers and the first downlink subband is associated with a second carrier of the one or more carriers.

Aspect 35: The method of any of aspects 19 through 34, wherein the second downlink subband is associated with a first carrier of the one or more carriers, the second uplink subband is associated with a second carrier of the one or more carriers, and the third downlink subband is associated with a third carrier of the one or more carriers.

Aspect 36: A UE for wireless communication, comprising one or more memories storing processor-executable code, and one or more processors coupled with the one or more memories and individually or collectively operable to execute the code to cause the UE to perform a method of any of aspects 1 through 18.

Aspect 37: A UE for wireless communication, comprising at least one means for performing a method of any of aspects 1 through 18.

Aspect 38: A non-transitory computer-readable medium storing code for wireless communication, the code comprising instructions executable by one or more processors to perform a method of any of aspects 1 through 18.

Aspect 39: A network entity for wireless communication, comprising one or more memories storing processor-executable code, and one or more processors coupled with the one or more memories and individually or collectively operable to execute the code to cause the network entity to perform a method of any of aspects 19 through 35.

Aspect 40: A network entity for wireless communication, comprising at least one means for performing a method of any of aspects 19 through 35.

Aspect 41: A non-transitory computer-readable medium storing code for wireless communication, the code comprising instructions executable by one or more processors to perform a method of any of aspects 19 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories, wherein the one or more processors are individually or collectively configured to cause the UE to:

transmit capability signaling indicating whether the UE supports more than one downlink subband within one or more carriers associated with a subband full duplex operation;

receive signaling indicating a subband full duplex configuration based at least in part on the capability signaling associated with the UE, wherein the subband full duplex configuration configures a first set of resources of the one or more carriers with a first downlink subband and a first uplink subband, or a second set of resources of the one or more carriers with a second downlink subband and a third downlink subband separated by at least a second uplink subband, or both; and communicate one or more messages according to the subband full duplex configuration.

2. The UE of claim 1, wherein the first downlink subband and the first uplink subband are separated by a first guard band, the second downlink subband and the second uplink subband are separated by a second guard band and the second uplink subband and the third downlink subband are separated by a third guard band, or both, according to the subband full duplex configuration.

3. The UE of claim 1, wherein the capability signaling indicates that the UE supports more than one downlink subband within the one or more carriers associated with the subband full duplex operation.

4. The UE of claim 3, wherein the one or more processors are individually or collectively configured to cause the UE to communicate by being individually or collectively configured to cause the UE to:

transmit a first message of the one or more messages using a first resource of the second set of resources; or receive a second message of the one or more messages using a second resource of the second set of resources.

5. The UE of claim 1, wherein the capability signaling indicates that the UE excludes support for more than one downlink subband within the one or more carriers associated with the subband full duplex operation.

6. The UE of claim 5, wherein the one or more processors are individually or collectively configured to cause the UE to communicate by being individually or collectively configured to cause the UE to:

communicate via the first set of resources.

7. The UE of claim 6, wherein the one or more processors are individually or collectively configured to cause the UE to communicate by being individually or collectively configured to cause the UE to:

refrain from communication via the second set of resources based at least in part on exclusion by the UE for support for more than one downlink subband within the one or more carriers.

8. The UE of claim 1, wherein the one or more processors are individually or collectively further configured to cause the UE to:

receive second signaling indicating a first channel state information reference signal (CSI-RS) resource associated with the second downlink subband and a second CSI-RS resource associated with the third downlink subband, wherein the first CSI-RS resource and the second CSI-RS resource are linked.

9. The UE of claim 1, wherein the one or more processors are individually or collectively further configured to cause the UE to:

receive second signaling indicating a channel state information reference signal (CSI-RS) resource that comprises non-contiguous resources within the second downlink subband and the third downlink subband.

10. The UE of claim 1, wherein the one or more processors are individually or collectively further configured to cause the UE to:

receive second signaling indicating a channel state information reference signal (CSI-RS) resource that comprises contiguous resources that span across the second downlink subband and the third downlink subband; and monitor for a CSI-RS based at least in part on an exclusion of the second uplink subband and one or more guard bands in-between the second downlink subband and the third downlink subband.

11. The UE of claim 1, wherein the one or more processors are individually or collectively further configured to cause the UE to:

transmit respective reports indicating one or more cross link interference received signal strength indicator measurements in the second downlink subband and the third downlink subband, wherein each downlink subband comprises one or more cross link interference received signal strength indicator resources.

12. The UE of claim 1, wherein the one or more processors are individually or collectively further configured to cause the UE to:

transmit a report indicating one or more cross link interference received signal strength indication measurements in the first downlink subband, the second downlink subband, the third downlink subband, or any combination thereof.

13. The UE of claim 1, wherein the one or more processors are individually or collectively further configured to cause the UE to:

transmit a report indicating one or more cross link interference received signal strength indication measurements based at least in part on a cross link interference received signal strength indicator resource that comprises non-contiguous resources in the second downlink subband and the third downlink subband.

14. The UE of claim 1, wherein the one or more processors are individually or collectively configured to cause the UE to receive the subband full duplex configuration by being individually or collectively to cause the UE:

receive the subband full duplex configuration in radio resource control signaling.

15. The UE of claim 1, wherein the first uplink subband is associated with a first carrier of the one or more carriers and the first downlink subband is associated with a second carrier of the one or more carriers.

16. The UE of claim 1, wherein the second downlink subband is associated with a first carrier of the one or more carriers, the second uplink subband is associated with a second carrier of the one or more carriers, and the third downlink subband is associated with a third carrier of the one or more carriers.

17. The UE of claim 1, wherein the second set of resources is associated with a precoder resource group and comprises one or more non-contiguous frequency resources across the second downlink subband and the third downlink subband, and one or more contiguous frequency resources within the second downlink subband and the third downlink subband based at least in part on the precoder resource group being wideband.

18. The UE of claim 1, wherein the second set of resources is associated with a precoder resource group and excludes one or more non-contiguous frequency resources across the second downlink subband and the third downlink subband based at least in part on the precoder resource group being wideband.

19. A network node, comprising:

one or more memories storing processor-executable code; and one or more processors coupled with the one or more memories, wherein the one or more processors are individually or collectively configured to cause the network node to:

obtain capability signaling indicating whether a user equipment (UE) supports more than one downlink subband within one or more carriers associated with a subband full duplex operation;

output signaling indicating a subband full duplex configuration based at least in part on the capability signaling associated with the UE, wherein the subband full duplex configuration configures a first set of resources of the one or more carriers with a first downlink subband and a first uplink subband, or a second set of resources of the one or more carriers with a second downlink subband and a third downlink subband separated by at least a second uplink subband, or both; and communicate one or more messages according to the subband full duplex configuration.

20. The network node of claim 19, wherein the first downlink subband and the first uplink subband are separated by a first guard band, the second downlink subband and the second uplink subband are separated by a second guard band and the second uplink subband and the third downlink subband are separated by a third guard band, or both, according to the subband full duplex configuration.

21. The network node of claim 19, wherein the one or more processors are individually or collectively further configured to cause the network node to:

transmit, using a first time resource, a first message of the one or more messages to the UE on the first downlink subband, the second downlink subband, or the third downlink subband, wherein the UE is a first half duplex UE; and receive, using the first time resource, a second message of the one or more messages from a second UE on the first uplink subband or the second uplink subband, wherein the second UE is a second half duplex UE.

22. The network node of claim 19, wherein the capability signaling indicates that the UE supports more than one downlink subband within the one or more carriers associated with the subband full duplex operation.

23. The network node of claim 22, wherein, the one or more processors are individually or collectively configured to cause the network node to communicate by being individually or collectively configured to cause the network node to:

transmit a first message of the one or more messages using a first resource of the second set of resources; or receive a second message of the one or more messages using a second resource of the second set of resources.

24. The network node of claim 19, wherein the capability signaling indicates that the UE excludes support for more than one downlink subband within the one or more carriers associated with the subband full duplex operation.

25. The network node of claim 24, wherein, to communicating, the one or more processors are individually or collectively operable to execute the code to cause the network node to:

communicate via the first set of resources.

26. The network node of claim 19, wherein the subband full duplex configuration excludes the configuration of the second downlink subband, the third downlink subband, and the second uplink subband based at least in part on the capability signaling indicating that the UE excludes support for more than one downlink subband within the one or more carriers.

27. A method for wireless communication at a user equipment (UE), comprising:

transmitting capability signaling indicating whether the UE supports more than one downlink subband within one or more carriers associated with a subband full duplex operation;

receiving signaling indicating a subband full duplex configuration based at least in part on the capability signaling associated with the UE, wherein the subband full duplex configuration configures a first set of resources of the one or more carriers with a first downlink subband and a first uplink subband, or a second set of resources of the one or more carriers with a second downlink subband and a third downlink subband separated by at least a second uplink subband, or both; and communicating one or more messages according to the subband full duplex configuration.

28. The method of claim 27, wherein the capability signaling indicates that the UE supports more than one downlink subband within the one or more carriers associated with the subband full duplex operation.

29. A method for wireless communication at a network node, comprising:

obtaining capability signaling indicating whether a user equipment (UE) supports more than one downlink subband within one or more carriers associated with a subband full duplex operation;

outputting signaling indicating a subband full duplex configuration based at least in part on the capability signaling associated with the UE, wherein the subband full duplex configuration configures a first set of resources of the one or more carriers with a first downlink subband and a first uplink subband, or a second set of resources of the one or more carriers with a second downlink subband and a third downlink subband separated by at least a second uplink subband, or both; and communicating one or more messages according to the subband full duplex configuration.

30. The method of claim 29, further comprising:

transmitting, using a first time resource, a first message of the one or more messages to the UE on the first downlink subband, the second downlink subband, or the third downlink subband, wherein the UE is a first half duplex UE; and receiving, using the first time resource, a second message of the one or more messages from a second UE on the first uplink subband or the second uplink subband, wherein the second UE is a second half duplex UE.

* * * * *